US012155853B2

United States Patent
Chen et al.

(10) Patent No.: US 12,155,853 B2
(45) Date of Patent: *Nov. 26, 2024

(54) PICTURE ENCODING AND DECODING METHOD AND APPARATUS FOR VIDEO SEQUENCE

(71) Applicant: Huawei Technologies Co., Ltd., Shenzhen (CN)

(72) Inventors: Xu Chen, Shenzhen (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,167

(22) Filed: Sep. 28, 2023

(65) Prior Publication Data

US 2024/0022748 A1     Jan. 18, 2024

Related U.S. Application Data

(63) Continuation of application No. 17/964,166, filed on Oct. 12, 2022, now Pat. No. 11,818,379, which is a
(Continued)

(30) Foreign Application Priority Data

Nov. 30, 2018    (CN) .......................... 201811458677.4

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11); *H04N 19/137* (2014.11); *H04N 19/176* (2014.11)

(58) Field of Classification Search
None
See application file for complete search history.

(56) References Cited

U.S. PATENT DOCUMENTS 6,671,321 B1     12/2003   Ohtani et al.
11,818,379 B2 *  11/2023   Chen ................... H04N 19/523
(Continued)

FOREIGN PATENT DOCUMENTS

CN    101340578 A    1/2009
CN    101605256 A    12/2009
(Continued)

OTHER PUBLICATIONS

Po, L., et al., "Novel Directional Gradient Descent Searches for Fast Block Motion Estimation," IEEE Transactions on Circuits and Systems for Video Technology, vol. 19, No. 8, Aug. 2009, 7 pages.
(Continued)

*Primary Examiner* — Christopher G Findley
(74) *Attorney, Agent, or Firm* — Conley Rose, P.C.

(57)     ABSTRACT

A picture decoding method includes determining motion information of a to-be-decoded block; obtaining a first decoding prediction block of the to-be-decoded block based on the motion information; performing motion search with first precision in the prediction reference picture block to obtain at least two second decoding prediction blocks; performing downsampling on the first decoding prediction block and the at least two second decoding prediction blocks to obtain a first sampling pixel array and at least two second sampling pixel arrays, respectively; calculating a difference between the first sampling pixel array and each of the second sampling pixel arrays, and using, as a target prediction motion vector, a motion vector corresponding to a second sampling pixel array with a minimum difference; and obtaining a target decoding prediction block of the to-be-decoded block based on the target prediction motion vector, and
(Continued)

decoding the to-be-decoded block based on the target decoding prediction block.

20 Claims, 7 Drawing Sheets

Related U.S. Application Data continuation of application No. 17/334,068, filed on May 28, 2021, now Pat. No. 11,503,317, which is a continuation of application No. PCT/CN2019/098151, filed on Jul. 29, 2019.

(51) Int. Cl.
*H04N 19/132* (2014.01)
*H04N 19/137* (2014.01)
*H04N 19/176* (2014.01)

(56) References Cited

U.S. PATENT DOCUMENTS

| | | |
|---|---|---|
| 2004/0114688 A1 | 6/2004 | Kang |
| 2005/0249284 A1 | 11/2005 | Lee et al. |
| 2012/0106645 A1 | 5/2012 | Lin et al. |
| 2013/0129242 A1 | 5/2013 | Lin et al. |
| 2015/0117535 A1 | 4/2015 | Li et al. |
| 2015/0264387 A1 | 9/2015 | Rapaka et al. |
| 2018/0131960 A1 | 5/2018 | Wang et al. |
| 2018/0184117 A1 | 6/2018 | Chen et al. |
| 2018/0262761 A1 | 9/2018 | Naito |
| 2019/0124347 A1 | 4/2019 | Stolt et al. |
| 2019/0230362 A1 | 7/2019 | Chen et al. |

FOREIGN PATENT DOCUMENTS

| | | |
|---|---|---|
| CN | 101931803 A | 12/2010 |
| CN | 102316317 A | 1/2012 |
| CN | 108900847 A | 11/2018 |
| JP | 2017225199 A | 12/2017 |
| JP | 2021530142 A | 11/2021 |
| TW | 201840183 A | 11/2018 |
| WO | 2018058622 A1 | 4/2018 |
| WO | 2019234672 A1 | 12/2019 |
| WO | 2020008343 A1 | 1/2020 |

OTHER PUBLICATIONS

JVET-L382, Unno, K., et al, "CE9-related: DMVR with Coarse-to-Fine Search and Block Size Limit," Joint Video Experts Team (JVET) of ITU-T SG 16 WP 3 and ISO/IEC JTC 1/SC 29/WG11, 12th Meeting: Macao, CN, Oct. 3-12, 2018, 4 pages.

JVET-L0670, Esenlik, S., et al, "Simplified DMVR for inclusion in VVC," Joint Video Experts Team (JVET) of ITU-T SG 16 WP 3 and ISO/IEC JTC 1/SC 29/WG11, 12th Meeting: Macao, CN, Oct. 3-12, 2018, 5 pages.

JVET-K0105-v1, Liu, H., et al, "CE9-related: Simplification of Decoder Side Motion Vector Derivation," Joint Video Experts Team (JVET) of ITU-T SG 16 WP 3 and ISO/IECJTC 1/SC 29/WG11, 11th Meeting: Ljubljana, SI, Jul. 10-18, 2018, 3 pages.

JVET-K0217_v1, Esenlink, S., et al, "CE9: DMVR with Bilateral Matching (Test2.9)," Joint Video Experts Team (JVET) of ITU-T SG 16 WP 3 and ISO/IEC JTC 1/SC 29/WG11, 11th Meeting: Ljubljana, SI, Jul. 10-18, 2018, 5 pages.

Document: JVET-K0199, Xu Chen et al, CE9: Simplification of DMVR (Test 9.1.1), Joint Video Exploration Team (JVET) of ITU-T SG 16 WP 3 and ISO/IEC JTC 1/SC 29/WG 11, 11th Meeting: Ljubljana, SI, Jul. 10-18, 2018, total 4 pages.

ITU-T H.265, Series H: Audiovisual and Multimedia Systems Infrastructure of audiovisual services—Coding of moving video, High efficiency video coding, Feb. 2018, total 692 pages.

Document: JVET-K0200, Xu Chen et al, CE9: DMVR extension based on template matching (Test 9.3.6), Joint Video Exploration Team (JVET) of ITU-T SG 16 WP 3 and ISO/IEC JTC 1/SC 29/WG 11, 11th Meeting: Ljubljana, SI, Jul. 10-18, 2018, total 4 pages.

Document: JVET-L0177, Xu Chen et al, CE 9: DMVR Simplifications (Test 9.2.8), Joint Video Experts Team (JVET) of ITU-T SG 16 WP 3 and ISO/IEC JTC 1/SC 29/WG 11, 12th Meeting: Macao, CN, Oct. 3-12, 2018, total 4 pages.

Document: JVET-D0029, Xu Chen et al, Decoder-Side Motion Vector Refinement Based on Bilateral Template Matching, Joint Video Exploration Team (JVET) of ITU-T SG 16 WP 3 and ISO/IEC JTC 1/SC 29/WG 11, 4th Meeting: Chengdu, CN, Oct. 15-21, 2016, total 4 pages.

Document: JVET-K0216-v3, Esenlik, S., et al., "CE9: DMVR with Motion Vector Difference Mirroring (Test 1.6)," Joint Video Experts Team (JVET) of ITU-T SG 16 WP 3 and 1S0/IEC JTC 1/SC 29/WG 11 11th Meeting: Ljubljana, SI, Jul. 10-18, 2018, XP030196661, 5 pages.

\* cited by examiner

PICTURE ENCODING AND DECODING METHOD AND APPARATUS FOR VIDEO SEQUENCE

CROSS-REFERENCE TO RELATED APPLICATIONS

This application is a continuation of U.S. patent application Ser. No. 17/964,166, filed on Oct. 12, 2022, which is a continuation of U.S. patent application Ser. No. 17/334,068, filed on May 28, 2021, which is a continuation of International Patent Application No. PCT/CN2019/098151, filed on Jul. 29, 2019, which claims priority to Chinese Patent Application No. 201811458677.4, filed on Nov. 30, 2018. The disclosures of the aforementioned applications are hereby incorporated by reference in their entireties.

TECHNICAL FIELD

The present disclosure relates to video picture technologies, and in particular, to a picture encoding and decoding method and apparatus for a video sequence.

BACKGROUND

In a video encoding and decoding framework, a hybrid coding structure is usually used for encoding and decoding of a video sequence. An encoder side of the hybrid coding structure generally includes a prediction module, a transform module, a quantization module, and an entropy encoding module. A decoder side of the hybrid coding structure generally includes an entropy decoding module, an inverse quantization module, an inverse transform module, and a prediction compensation module. A combination of these encoding and decoding modules can effectively eliminate redundant information from a video sequence, and ensure that a coded picture of the video sequence is obtained on the decoder side. In a video encoding and decoding framework, a picture in a video sequence is usually divided into picture blocks for coding, that is, a frame of picture is divided into several picture blocks, and encoding and decoding are performed based on these picture blocks by using the foregoing modules.

In the foregoing modules, the prediction module and the prediction compensation module may use two technologies: intra prediction and inter prediction. In the inter prediction technology, to effectively remove redundant information of a current picture block in a to-be-predicted picture, a decoder-side motion vector refinement (DMVR) technology is used.

However, calculation complexity of the DMVR technology is comparatively high.

SUMMARY

The present disclosure provides a picture encoding and decoding method and apparatus for a video sequence, to reduce a calculation amount of difference comparison and improve picture coding efficiency.

According to a first aspect, the present disclosure provides a picture decoding method for a video sequence. The method includes determining motion information of a to-be-decoded block, where the motion information includes a prediction motion vector and reference picture information, and the reference picture information is used to identify a prediction reference picture block; obtaining a first decoding prediction block of the to-be-decoded block based on the motion information; performing motion search with first precision in the prediction reference picture block to obtain at least two second decoding prediction blocks, where a search position of the motion search is determined based on the prediction motion vector and the first precision; performing downsampling on the first decoding prediction block to obtain a first sampling pixel array; performing downsampling on the at least two second decoding prediction blocks to obtain at least two second sampling pixel arrays; calculating a difference between the first sampling pixel array and each of the second sampling pixel arrays, and using, as a target prediction motion vector of the to-be-decoded block, a motion vector between the to-be-decoded block and a second decoding prediction block corresponding to a second sampling pixel array with a minimum difference; and obtaining a target decoding prediction block of the to-be-decoded block based on the target prediction motion vector, and decoding the to-be-decoded block based on the target decoding prediction block.

In the present disclosure, a quantity of second decoding prediction blocks obtained by performing motion search on the prediction reference picture block is reduced, and pixels in the picture block are sampled, so that a calculation amount of difference comparison is reduced, and picture decoding efficiency is improved.

In a possible implementation, calculating the difference between the first sampling pixel array and each of the second sampling pixel arrays includes calculating a sum of absolute values of pixel differences of pixels at corresponding locations in the first sampling pixel array and each of the second sampling pixel arrays, and using the sum of the absolute values of the pixel differences as the difference; or calculating a sum of squares of pixel differences of pixels at corresponding locations in the first sampling pixel array and each of the second sampling pixel arrays, and using the sum of squares of the pixel differences as the difference.

A beneficial effect of this implementation is that different methods are used to determine the difference, and a plurality of solutions with different levels of complexity are provided.

In a possible implementation, the at least two second decoding prediction blocks include a base block, an upper block, a lower block, a left block, and a right block, and performing the motion search with first precision in the prediction reference picture block to obtain at least two second decoding prediction blocks includes excluding the lower block from the at least two second decoding prediction blocks when a difference corresponding to the upper block is less than a difference corresponding to the base block, where the base block is obtained in the prediction reference picture block based on the prediction motion vector, the upper block is obtained in the prediction reference picture block based on a first prediction vector, a position indicated by the first prediction vector is obtained by shifting a position indicated by the prediction motion vector upward by a target offset, the lower block is obtained in the prediction reference picture block based on a second prediction vector, a position indicated by the second prediction vector is obtained by shifting the position indicated by the prediction motion vector downward by the target offset, and the target offset is determined based on the first precision; or excluding the upper block from the at least two second decoding prediction blocks when a difference corresponding to the lower block is less than a difference corresponding to the base block; or excluding the right block from the at least two second decoding prediction blocks when a difference corresponding to the left block is less than a difference corresponding to the base block, where the left block is obtained in the prediction reference picture block based on a third prediction vector, a position indicated by the third prediction vector is obtained by shifting a position indicated by the prediction motion vector leftward by a target offset, the right block is obtained in the prediction reference picture block based on a fourth prediction vector, and a position indicated by the fourth prediction vector is obtained by shifting the position indicated by the prediction motion vector rightward by the target offset; or excluding the left block from the at least two second decoding prediction blocks when a difference corresponding to the right block is less than a difference corresponding to the base block.

In a possible implementation, performing the motion search with first precision in the prediction reference picture block to obtain at least two second decoding prediction blocks further includes when the lower block and the right block are excluded, obtaining an upper left block in the prediction reference picture block based on a fifth prediction vector, where a position indicated by the fifth prediction vector is obtained by shifting the position indicated by the prediction motion vector leftward by the target offset and upward by the target offset, and the upper left block is one of the at least two second decoding prediction blocks; when the lower block and the left block are excluded, obtaining an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second decoding prediction blocks, when the upper block and the left block are excluded, obtaining a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second decoding prediction blocks; or when the upper block and the right block are excluded, obtaining a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second decoding prediction blocks.

A beneficial effect of this implementation is that a quantity of search points is reduced, and implementation complexity is reduced.

In a possible implementation, the at least two second decoding prediction blocks include an upper block, a lower block, a left block, and a right block, and performing the motion search with first precision in the prediction reference picture block to obtain at least two second decoding prediction blocks includes when a difference corresponding to the upper block is less than a difference corresponding to the lower block, and a difference corresponding to the left block is less than a difference corresponding to the right block, obtaining an upper left block in the prediction reference picture block based on a fifth prediction vector, where a position indicated by the fifth prediction vector is obtained by shifting a position indicated by the prediction motion vector leftward by the target offset and upward by the target offset, the upper left block is one of the at least two second decoding prediction blocks, the upper block is obtained in the prediction reference picture block based on a first prediction vector, and a position indicated by the first prediction vector is obtained by shifting the position indicated by the prediction motion vector upward by the target offset; the lower block is obtained in the prediction reference picture block based on a second prediction vector, and a position indicated by the second prediction vector is obtained by shifting the position indicated by the prediction motion vector downward by the target offset, the left block is obtained in the prediction reference picture block based on a third prediction vector, and a position indicated by the third prediction vector is obtained by shifting the position indicated by the prediction motion vector leftward by the target offset, the right block is obtained in the prediction reference picture block based on a fourth prediction vector, and a position indicated by the fourth prediction vector is obtained by shifting the position indicated by the prediction motion vector rightward by the target offset, and the target offset is determined based on the first precision, or when a difference corresponding to the upper block is less than a difference corresponding to the lower block, and a difference corresponding to the right block is less than a difference corresponding to the left block, obtaining an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second decoding prediction blocks, or when a difference corresponding to the lower block is less than a difference corresponding to the upper block, and a difference corresponding to the right block is less than a difference corresponding to the left block, obtaining a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second decoding prediction blocks, or when a difference corresponding to the lower block is less than a difference corresponding to the upper block, and a difference corresponding to the left block is less than a difference corresponding to the right block, obtaining a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second decoding prediction blocks.

A beneficial effect of this implementation is that a quantity of search points is reduced, and implementation complexity is reduced.

In a possible implementation, after determining the motion information of a to-be-decoded block, the method further includes rounding up or down the motion vector.

A beneficial effect of this implementation is that a reference picture interpolation process that is required because a motion vector is not an integer is not required, and implementation complexity is reduced.

In a possible implementation, after performing the motion search with first precision in the prediction reference picture block to obtain at least two second decoding prediction blocks, the method further includes rounding up or down prediction motion vectors respectively corresponding to the at least two second decoding prediction blocks.

A beneficial effect of this implementation is that a reference picture interpolation process, which was required because a motion vector is not an integer is not required, and implementation complexity is reduced.

According to a second aspect, the present disclosure provides a picture encoding method for a video sequence. The method includes determining motion information of a to-be-encoded block, where the motion information includes a prediction motion vector and reference picture information, and the reference picture information is used to identify a prediction reference picture block, obtaining a first encoding prediction block of the to-be-encoded block based on the motion information, performing motion search with first precision in the prediction reference picture block to obtain at least two second encoding prediction blocks, where a search position of the motion search is determined based on the prediction motion vector and the first precision, performing downsampling on the first encoding prediction block to obtain a first sampling pixel array, performing downsampling on the at least two second encoding prediction blocks to obtain at least two second sampling pixel arrays, calculating a difference between the first sampling pixel array and each of the second sampling pixel arrays, and using, as a target prediction motion vector of the to-be-encoded block, a motion vector between the to-be-encoded block and a second encoding prediction block corresponding to a second sampling pixel array with a minimum difference, and obtaining a target encoding prediction block of the to-be-encoded block based on the target prediction motion vector, and encoding the to-be-encoded block based on the target encoding prediction block.

In the present disclosure, a quantity of second encoding prediction blocks obtained by performing motion search on the prediction reference picture block is reduced, and pixels in the picture block are sampled, so that a calculation amount of difference comparison is reduced, and picture encoding efficiency is improved.

In a possible implementation, calculating the difference between the first sampling pixel array and each of the second sampling pixel arrays includes calculating a sum of absolute values of pixel differences of pixels at corresponding locations in the first sampling pixel array and each of the second sampling pixel arrays, and using the sum of the absolute values of the pixel differences as the difference, or calculating a sum of squares of pixel differences of pixels at corresponding locations in the first sampling pixel array and each of the second sampling pixel arrays, and using the sum of squares of the pixel differences as the difference.

In a possible implementation, the at least two second encoding prediction blocks include a base block, an upper block, a lower block, a left block, and a right block, and performing the motion search with first precision in the prediction reference picture block to obtain at least two second encoding prediction blocks includes excluding the lower block from the at least two second encoding prediction blocks when a difference corresponding to the upper block is less than a difference corresponding to the base block, where the base block is obtained in the prediction reference picture block based on the prediction motion vector, the upper block is obtained in the prediction reference picture block based on a first prediction vector, a position indicated by the first prediction vector is obtained by shifting a position indicated by the prediction motion vector upward by a target offset, the lower block is obtained in the prediction reference picture block based on a second prediction vector, a position indicated by the second prediction vector is obtained by shifting the position indicated by the prediction motion vector downward by the target offset, and the target offset is determined based on the first precision, or excluding the upper block from the at least two second encoding prediction blocks when a difference corresponding to the lower block is less than a difference corresponding to the base block, or excluding the right block from the at least two second encoding prediction blocks when a difference corresponding to the left block is less than a difference corresponding to the base block, where the left block is obtained in the prediction reference picture block based on a third prediction vector, a position indicated by the third prediction vector is obtained by shifting a position indicated by the prediction motion vector leftward by a target offset, the right block is obtained in the prediction reference picture block based on a fourth prediction vector, and a position indicated by the fourth prediction vector is obtained by shifting the position indicated by the prediction motion vector rightward by the target offset, or excluding the left block from the at least two second encoding prediction blocks when a difference corresponding to the right block is less than a difference corresponding to the base block.

In a possible implementation, performing the motion search with first precision in the prediction reference picture block to obtain at least two second encoding prediction blocks further includes when the lower block and the right block are excluded, obtaining an upper left block in the prediction reference picture block based on a fifth prediction vector, where a position indicated by the fifth prediction vector is obtained by shifting the position indicated by the prediction motion vector leftward by the target offset and upward by the target offset, and the upper left block is one of the at least two second encoding prediction blocks, when the lower block and the left block are excluded, obtaining an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second encoding prediction blocks, when the upper block and the left block are excluded, obtaining a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second encoding prediction blocks, or when the upper block and the right block are excluded, obtaining a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second encoding prediction blocks.

In a possible implementation, the at least two second encoding prediction blocks include an upper block, a lower block, a left block, and a right block, and performing the motion search with first precision in the prediction reference picture block to obtain at least two second encoding prediction blocks includes when a difference corresponding to the upper block is less than a difference corresponding to the lower block, and a difference corresponding to the left block is less than a difference corresponding to the right block, obtaining an upper left block in the prediction reference picture block based on a fifth prediction vector, where a position indicated by the fifth prediction vector is obtained by shifting a position indicated by the prediction motion vector leftward by the target offset and upward by the target offset, the upper left block is one of the at least two second encoding prediction blocks, the upper block is obtained in the prediction reference picture block based on a first prediction vector, and a position indicated by the first prediction vector is obtained by shifting the position indicated by the prediction motion vector upward by the target offset, the lower block is obtained in the prediction reference picture block based on a second prediction vector, and a position indicated by the second prediction vector is obtained by shifting the position indicated by the prediction motion vector downward by the target offset, the left block is obtained in the prediction reference picture block based on a third prediction vector, and a position indicated by the third prediction vector is obtained by shifting the position indicated by the prediction motion vector leftward by the target offset, the right block is obtained in the prediction reference picture block based on a fourth prediction vector, and a position indicated by the fourth prediction vector is obtained by shifting the position indicated by the prediction motion vector rightward by the target offset, and the target offset is determined based on the first precision, or when a difference corresponding to the upper block is less than a difference corresponding to the lower block, and a difference corresponding to the right block is less than a difference corresponding to the left block, obtaining an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second encoding prediction blocks, or when a difference corresponding to the lower block is less than a difference corresponding to the upper block, and a difference corresponding to the right block is less than a difference corresponding to the left block, obtaining a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second encoding prediction blocks, or when a difference corresponding to the lower block is less than a difference corresponding to the upper block, and a difference corresponding to the left block is less than a difference corresponding to the right block, obtaining a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second encoding prediction blocks.

In a possible implementation, after determining the motion information of a to-be-encoded block, the method further includes rounding up or down the motion vector.

In a possible implementation, after performing the motion search with first precision in the prediction reference picture block to obtain at least two second encoding prediction blocks, the method further includes rounding up or down prediction motion vectors respectively corresponding to the at least two second encoding prediction blocks.

According to a third aspect, the present disclosure provides a picture decoding apparatus for a video sequence. The apparatus includes a determining module configured to determine motion information of a to-be-decoded block, where the motion information includes a prediction motion vector and reference picture information, and the reference picture information is used to identify a prediction reference picture block; a processing module configured to: obtain a first decoding prediction block of the to-be-decoded block based on the motion information, perform motion search with first precision in the prediction reference picture block to obtain at least two second decoding prediction blocks, where a search position of the motion search is determined based on the prediction motion vector and the first precision, perform downsampling on the first decoding prediction block to obtain a first sampling pixel array, perform downsampling on the at least two second decoding prediction blocks to obtain at least two second sampling pixel arrays, calculate a difference between the first sampling pixel array and each of the second sampling pixel arrays, and use, as a target prediction motion vector of the to-be-decoded block, a motion vector between the to-be-decoded block and a second decoding prediction block corresponding to a second sampling pixel array with a minimum difference, and a decoding module configured to obtain a target decoding prediction block of the to-be-decoded block based on the target prediction motion vector, and decode the to-be-decoded block based on the target decoding prediction block.

In the present disclosure, a quantity of second decoding prediction blocks obtained by performing motion search on the prediction reference picture block is reduced, and pixels in the picture block are sampled, so that a calculation amount of difference comparison is reduced, and picture decoding efficiency is improved.

In a possible implementation, the processing module is configured to: calculate a sum of absolute values of pixel differences of pixels at corresponding locations in the first sampling pixel array and each of the second sampling pixel arrays, and use the sum of the absolute values of the pixel differences as the difference, or calculate a sum of squares of pixel differences of pixels at corresponding locations in the first sampling pixel array and each of the second sampling pixel arrays, and use the sum of squares of the pixel differences as the difference.

In a possible implementation, the at least two second decoding prediction blocks include a base block, an upper block, a lower block, a left block, and a right block. The processing module is configured to: exclude the lower block from the at least two second decoding prediction blocks when a difference corresponding to the upper block is less than a difference corresponding to the base block, where the base block is obtained in the prediction reference picture block based on the prediction motion vector, the upper block is obtained in the prediction reference picture block based on a first prediction vector, a position indicated by the first prediction vector is obtained by shifting a position indicated by the prediction motion vector upward by a target offset, the lower block is obtained in the prediction reference picture block based on a second prediction vector, a position indicated by the second prediction vector is obtained by shifting the position indicated by the prediction motion vector downward by the target offset, and the target offset is determined based on the first precision, or exclude the upper block from the at least two second decoding prediction blocks when a difference corresponding to the lower block is less than a difference corresponding to the base block, or exclude the right block from the at least two second decoding prediction blocks when a difference corresponding to the left block is less than a difference corresponding to the base block, where the left block is obtained in the prediction reference picture block based on a third prediction vector, a position indicated by the third prediction vector is obtained by shifting a position indicated by the prediction motion vector leftward by a target offset, the right block is obtained in the prediction reference picture block based on a fourth prediction vector, and a position indicated by the fourth prediction vector is obtained by shifting the position indicated by the prediction motion vector rightward by the target offset, or exclude the left block from the at least two second decoding prediction blocks when a difference corresponding to the right block is less than a difference corresponding to the base block.

In a possible implementation, the processing module is further configured to: when the lower block and the right block are excluded, obtain an upper left block in the prediction reference picture block based on a fifth prediction vector, where a position indicated by the fifth prediction vector is obtained by shifting the position indicated by the prediction motion vector leftward by the target offset and upward by the target offset, and the upper left block is one of the at least two second decoding prediction blocks, when the lower block and the left block are excluded, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second decoding prediction blocks, when the upper block and the left block are excluded, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second decoding prediction blocks, or when the upper block and the right block are excluded, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second decoding prediction blocks.

In a possible implementation, the at least two second decoding prediction blocks include an upper block, a lower block, a left block, and a right block. The processing module is configured to: when a difference corresponding to the upper block is less than a difference corresponding to the lower block, and a difference corresponding to the left block is less than a difference corresponding to the right block, obtain an upper left block in the prediction reference picture block based on a fifth prediction vector, where a position indicated by the fifth prediction vector is obtained by shifting a position indicated by the prediction motion vector leftward by the target offset and upward by the target offset, the upper left block is one of the at least two second decoding prediction blocks, the upper block is obtained in the prediction reference picture block based on a first prediction vector, and a position indicated by the first prediction vector is obtained by shifting the position indicated by the prediction motion vector upward by the target offset, the lower block is obtained in the prediction reference picture block based on a second prediction vector, and a position indicated by the second prediction vector is obtained by shifting the position indicated by the prediction motion vector downward by the target offset, the left block is obtained in the prediction reference picture block based on a third prediction vector, and a position indicated by the third prediction vector is obtained by shifting the position indicated by the prediction motion vector leftward by the target offset, the right block is obtained in the prediction reference picture block based on a fourth prediction vector, and a position indicated by the fourth prediction vector is obtained by shifting the position indicated by the prediction motion vector rightward by the target offset, and the target offset is determined based on the first precision, or when a difference corresponding to the upper block is less than a difference corresponding to the lower block, and a difference corresponding to the right block is less than a difference corresponding to the left block, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second decoding prediction blocks, or when a difference corresponding to the lower block is less than a difference corresponding to the upper block, and a difference corresponding to the right block is less than a difference corresponding to the left block, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second decoding prediction blocks, or when a difference corresponding to the lower block is less than a difference corresponding to the upper block, and a difference corresponding to the left block is less than a difference corresponding to the right block, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second decoding prediction blocks.

In a possible implementation, the processing module is further configured to round up or down the motion vector.

In a possible implementation, the processing module is further configured to round up or down prediction motion vectors respectively corresponding to the at least two second decoding prediction blocks.

According to a fourth aspect, the present disclosure provides a picture encoding apparatus for a video sequence. The apparatus includes a determining module configured to determine motion information of a to-be-encoded block, where the motion information includes a prediction motion vector and reference picture information, and the reference picture information is used to identify a prediction reference picture block, a processing module configured to: obtain a first encoding prediction block of the to-be-encoded block based on the motion information, perform motion search with first precision in the prediction reference picture block to obtain at least two second encoding prediction blocks, where a search position of the motion search is determined based on the prediction motion vector and the first precision, perform downsampling on the first encoding prediction block to obtain a first sampling pixel array, perform downsampling on the at least two second encoding prediction blocks to obtain at least two second sampling pixel arrays, calculate a difference between the first sampling pixel array and each of the second sampling pixel arrays, and use, as a target prediction motion vector of the to-be-encoded block, a motion vector between the to-be-encoded block and a second encoding prediction block corresponding to a second sampling pixel array with a minimum difference, and an encoding module configured to obtain a target encoding prediction block of the to-be-encoded block based on the target prediction motion vector, and encode the to-be-encoded block based on the target encoding prediction block.

In the present disclosure, a quantity of second encoding prediction blocks obtained by performing motion search on the prediction reference picture block is reduced, and pixels in the picture block are sampled, so that a calculation amount of difference comparison is reduced, and picture encoding efficiency is improved.

In a possible implementation, the processing module is configured to: calculate a sum of absolute values of pixel differences of pixels at corresponding locations in the first sampling pixel array and each of the second sampling pixel arrays, and use the sum of the absolute values of the pixel differences as the difference, or calculate a sum of squares of pixel differences of pixels at corresponding locations in the first sampling pixel array and each of the second sampling pixel arrays, and use the sum of squares of the pixel differences as the difference.

In a possible implementation, the at least two second encoding prediction blocks include a base block, an upper block, a lower block, a left block, and a right block. The processing module is configured to: exclude the lower block from the at least two second encoding prediction blocks when a difference corresponding to the upper block is less than a difference corresponding to the base block, where the base block is obtained in the prediction reference picture block based on the prediction motion vector, the upper block is obtained in the prediction reference picture block based on a first prediction vector, a position indicated by the first prediction vector is obtained by shifting a position indicated by the prediction motion vector upward by a target offset, the lower block is obtained in the prediction reference picture block based on a second prediction vector, a position indicated by the second prediction vector is obtained by shifting the position indicated by the prediction motion vector downward by the target offset, and the target offset is determined based on the first precision, or exclude the upper block from the at least two second encoding prediction blocks when a difference corresponding to the lower block is less than a difference corresponding to the base block, or exclude the right block from the at least two second encoding prediction blocks when a difference corresponding to the left block is less than a difference corresponding to the base block, where the left block is obtained in the prediction reference picture block based on a third prediction vector, a position indicated by the third prediction vector is obtained by shifting a position indicated by the prediction motion vector leftward by a target offset, the right block is obtained in the prediction reference picture block based on a fourth prediction vector, and a position indicated by the fourth prediction vector is obtained by shifting the position indicated by the prediction motion vector rightward by the target offset, or exclude the left block from the at least two second encoding prediction blocks when a difference corresponding to the right block is less than a difference corresponding to the base block.

In a possible implementation, the processing module is further configured to: when the lower block and the right block are excluded, obtain an upper left block in the prediction reference picture block based on a fifth prediction vector, where a position indicated by the fifth prediction vector is obtained by shifting the position indicated by the prediction motion vector leftward by the target offset and upward by the target offset, and the upper left block is one of the at least two second encoding prediction blocks, when the lower block and the left block are excluded, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second encoding prediction blocks, when the upper block and the left block are excluded, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second encoding prediction blocks, or when the upper block and the right block are excluded, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second encoding prediction blocks.

In a possible implementation, the at least two second encoding prediction blocks include an upper block, a lower block, a left block, and a right block. The processing module is configured to: when a difference corresponding to the upper block is less than a difference corresponding to the lower block, and a difference corresponding to the left block is less than a difference corresponding to the right block, obtain an upper left block in the prediction reference picture block based on a fifth prediction vector, where a position indicated by the fifth prediction vector is obtained by shifting a position indicated by the prediction motion vector leftward by the target offset and upward by the target offset, the upper left block is one of the at least two second encoding prediction blocks, the upper block is obtained in the prediction reference picture block based on a first prediction vector, and a position indicated by the first prediction vector is obtained by shifting the position indicated by the prediction motion vector upward by the target offset, the lower block is obtained in the prediction reference picture block based on a second prediction vector, and a position indicated by the second prediction vector is obtained by shifting the position indicated by the prediction motion vector downward by the target offset, the left block is obtained in the prediction reference picture block based on a third prediction vector, and a position indicated by the third prediction vector is obtained by shifting the position indicated by the prediction motion vector leftward by the target offset, the right block is obtained in the prediction reference picture block based on a fourth prediction vector, and a position indicated by the fourth prediction vector is obtained by shifting the position indicated by the prediction motion vector rightward by the target offset, and the target offset is determined based on the first precision, or when a difference corresponding to the upper block is less than a difference corresponding to the lower block, and a difference corresponding to the right block is less than a difference corresponding to the left block, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second encoding prediction blocks, or when a difference corresponding to the lower block is less than a difference corresponding to the upper block, and a difference corresponding to the right block is less than a difference corresponding to the left block, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second encoding prediction blocks, or when a difference corresponding to the lower block is less than a difference corresponding to the upper block, and a difference corresponding to the left block is less than a difference corresponding to the right block, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second encoding prediction blocks.

In a possible implementation, the processing module is further configured to round up or down the motion vector.

In a possible implementation, the processing module is further configured to round up or down prediction motion vectors respectively corresponding to the at least two second encoding prediction blocks.

According to a fifth aspect, the present disclosure provides a codec device, including: one or more controllers, and a memory configured to store one or more programs, where when the one or more programs are executed by the one or more processors, the one or more processors are enabled to implement the method according to the first aspect or the second aspect.

According to a sixth aspect, the present disclosure provides a computer-readable storage medium. The computer-readable storage medium stores instructions, and when the instructions are run on a computer, the computer is configured to perform the method according to the first aspect or the second aspect.

According to a seventh aspect, the present disclosure provides a computer program. When the computer program is executed by a computer, the computer is configured to perform the method according to the first aspect or the second aspect.

BRIEF DESCRIPTION OF DRAWINGS

To describe the technical solutions in some embodiments of the present disclosure, the following briefly describes the accompanying drawings. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
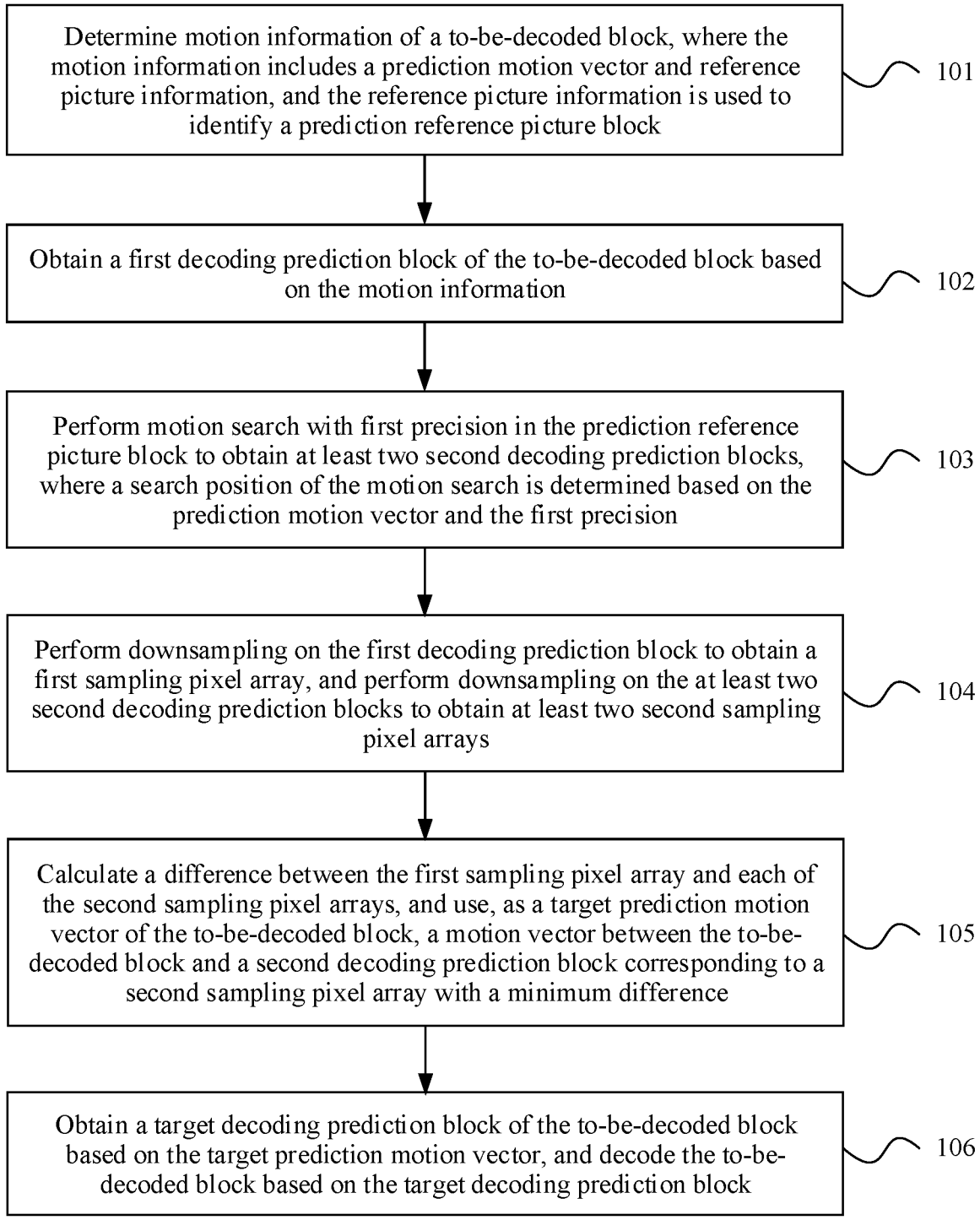
FIG. 1 is a flowchart of a picture decoding method for a video sequence according to an embodiment of the present disclosure.

The following clearly describes technical solutions in embodiments of the present disclosure with reference to the accompanying drawings in the embodiments of the present disclosure. It is clear that the described embodiments are merely some but not all of the embodiments of the present disclosure. All other embodiments obtained by a person of ordinary skill in the art based on the embodiments of the present disclosure without creative efforts shall fall within the protection scope of the present disclosure.

A procedure of an inter prediction picture encoding method in a DMVR technology is as follows:

1. Determine motion information of a to-be-encoded block, where the motion information includes a prediction motion vector and reference picture information, and the reference picture information is used to identify a prediction reference picture block.

The to-be-encoded block is a current picture block to be encoded. The prediction motion vector in the motion information includes a forward prediction motion vector and a backward prediction motion vector. The reference picture information includes reference frame index information of a forward prediction reference picture block and a backward prediction reference picture block (that is, picture order counts (POC) of forward and backward prediction reference picture blocks). The prediction reference picture block of the to-be-encoded block may be obtained based on the prediction motion vector of the to-be-encoded block or the reference picture information.

2. Perform bidirectional prediction on the to-be-encoded block based on the motion information to obtain an initial encoding prediction block of the to-be-encoded block, and obtain a first encoding prediction block of the to-be-encoded block based on the initial encoding prediction block.

When a POC corresponding to the prediction reference picture block is not equal to a POC of the to-be-encoded block, bidirectional prediction, including forward prediction and backward prediction, is performed on the to-be-encoded block based on the motion information. Performing forward prediction on the to-be-encoded block based on the motion information, that is, performing forward prediction on the to-be-encoded block based on forward motion information to obtain a forward initial encoding prediction block of the to-be-encoded block includes performing forward prediction on the to-be-encoded block based on the forward prediction reference picture block in the motion information to obtain the forward initial encoding prediction block of the to-be-encoded block, or performing forward prediction on the to-be-encoded block based on the forward prediction motion vector in the motion information to obtain the forward initial encoding prediction block of the to-be-encoded block. Performing backward prediction on the to-be-encoded block based on the motion information, that is, performing backward prediction on the to-be-encoded block based on backward motion information to obtain a backward initial encoding prediction block of the to-be-encoded block includes performing backward prediction on the to-be-encoded block based on the backward prediction reference picture block in the motion information to obtain the backward initial encoding prediction block of the to-be-encoded block, or performing backward prediction on the to-be-encoded block based on the backward prediction motion vector in the motion information to obtain the backward initial encoding prediction block of the to-be-encoded block.

In an embodiment, obtaining a first encoding prediction block of the to-be-encoded block based on the initial encoding prediction block includes the following three implementations: One implementation is performing weighted summation on the forward initial encoding prediction block and the backward initial encoding prediction block to obtain the first encoding prediction block of the to-be-encoded block. Another implementation is using the forward initial encoding prediction block as the first encoding prediction block of the to-be-encoded block. The last implementation is using the backward initial encoding prediction block as the first encoding prediction block of the to-be-encoded block.

3. Perform motion search with first precision in the prediction reference picture block to obtain at least one second encoding prediction block.

Search positions of the motion search are determined based on the prediction motion vector and the first precision. In a feasible implementation, the positions of the motion search are positions, in the first precision, around a position identified by the prediction motion vector. For example, the position identified by the prediction motion vector is (1, 1), and the first precision is ½ pixel precision. In this case, the positions of the motion search include nine positions in total: (1, 1), (1, 1.5) above (1, 1), (1, 0.5) below (1, 1), (0.5, 1) on the left, (1.5, 1) on the right, (1.5, 1.5) on the upper right, (1.5, 0.5) on the lower right, (0.5, 1.5) on the upper left, and (0.5, 0.5) on the lower left.

Motion search with the first precision may be performed on the forward prediction reference picture block based on the forward prediction motion vector, and a forward encoding prediction block obtained in each search is used as a second forward encoding prediction block, to obtain at least one second encoding prediction block. Then, motion search with the first precision is performed on the backward prediction reference picture block based on the backward prediction motion vector, and a backward encoding prediction block obtained in each search is used as a second backward encoding prediction block, to obtain at least one second encoding prediction block. The second encoding prediction block includes the second forward encoding prediction block and the second backward encoding prediction block. The first precision includes integer pixel precision, ½ pixel precision, ¼ pixel precision, or ⅛ pixel precision, which is not limited.

4. Calculate a difference between the first encoding prediction block and each second encoding prediction block, and use a motion vector between the to-be-encoded block and a second encoding prediction block with a minimum difference as a target prediction motion vector of the to-be-encoded block.

Difference comparison is performed between each second forward encoding prediction block and the first encoding prediction block, and a forward motion vector between the to-be-encoded block and a second forward encoding prediction block with a minimum difference as a target forward prediction motion vector. Difference comparison is performed between each second backward encoding prediction block and the first encoding prediction block, and a backward motion vector between the to-be-encoded block and a second backward encoding prediction block with a minimum difference as a target backward prediction motion vector. The target prediction motion vector includes the target forward prediction motion vector and the target backward prediction motion vector. During difference comparison, a sum of absolute values of all pixel differences in the two picture blocks may be used as a difference between the second encoding prediction block and the first encoding prediction block, or a sum of squares of all pixel differences in the two picture blocks may be used as a difference between the second encoding prediction block and the first encoding prediction block.

5. Perform bidirectional prediction on the to-be-encoded block based on the target prediction motion vector to obtain a third encoding prediction block of the to-be-encoded block.

Forward prediction is performed on the to-be-encoded block based on the target forward prediction motion vector to obtain a third forward encoding prediction block of the to-be-encoded block, and then backward prediction is performed on the to-be-encoded block based on the target backward prediction motion vector to obtain a third backward encoding prediction block of the to-be-encoded block.

6. Obtain a target encoding prediction block of the to-be-encoded block based on the third encoding prediction block, and encode the to-be-encoded block based on the target encoding prediction block.

Weighted summation may be performed on the third forward encoding prediction block and the third backward encoding prediction block to obtain the target encoding prediction block of the to-be-encoded block, or the third forward encoding prediction block may be used as the target encoding prediction block of the to-be-encoded block, or the third backward encoding prediction block may be used as the target encoding prediction block of the to-be-encoded block.

A procedure of an inter prediction picture decoding method in the DMVR technology is as follows:

1. Determine motion information of a to-be-decoded block, where the motion information includes a prediction motion vector and reference picture information, and the reference picture information is used to identify a prediction reference picture block.

The to-be-decoded block is a current picture block to be decoded. The prediction motion vector in the motion information includes a forward prediction motion vector and a backward prediction motion vector. The reference picture information includes reference frame index information of a forward prediction reference picture block and a backward prediction reference picture block (that is, picture order counts (POC) of forward and backward prediction reference picture blocks). The prediction reference picture block of the to-be-decoded block may be obtained based on the prediction motion vector of the to-be-decoded block or the reference picture information.

2. Perform bidirectional prediction on the to-be-decoded block based on the motion information to obtain an initial decoding prediction block of the to-be-decoded block, and obtain a first decoding prediction block of the to-be-decoded block based on the initial decoding prediction block.

When a POC corresponding to the prediction reference picture block is not equal to a POC of the to-be-decoded block, bidirectional prediction, including forward prediction and backward prediction, is performed on the to-be-decoded block based on the motion information. Performing forward prediction on the to-be-decoded block based on the motion information, that is, performing forward prediction on the to-be-decoded block based on forward motion information to obtain a forward initial decoding prediction block of the to-be-decoded block includes performing forward prediction on the to-be-decoded block based on the forward prediction reference picture block in the motion information to obtain the forward initial decoding prediction block of the to-be-decoded block, or performing forward prediction on the to-be-decoded block based on the forward prediction motion vector in the motion information to obtain the forward initial decoding prediction block of the to-be-decoded block. Performing backward prediction on the to-be-decoded block based on the motion information, that is, performing backward prediction on the to-be-decoded block based on backward motion information to obtain a backward initial decoding prediction block of the to-be-decoded block includes performing forward prediction on the to-be-decoded block based on the backward prediction reference picture block in the motion information to obtain the forward initial decoding prediction block of the to-be-decoded block, or performing forward prediction on the to-be-decoded block based on the backward prediction motion vector in the motion information to obtain the forward initial decoding prediction block of the to-be-decoded block.

In an embodiment, obtaining a first decoding prediction block of the to-be-decoded block based on the initial decoding prediction block includes the following three implementations: One implementation is performing weighted summation on the forward initial decoding prediction block and the backward initial decoding prediction block to obtain the first decoding prediction block of the to-be-decoded block. Another implementation is using the forward initial decoding prediction block as the first decoding prediction block of the to-be-decoded block. The last implementation is using the backward initial decoding prediction block as the first decoding prediction block of the to-be-decoded block.

3. Perform motion search with first precision in the prediction reference picture block to obtain at least one second decoding prediction block.

Search positions of the motion search are determined based on the prediction motion vector and the first precision. In a feasible implementation, the positions of the motion search are positions, in the first precision, around a position identified by the prediction motion vector. For example, the position identified by the prediction motion vector is (1, 1), and the first precision is ½ pixel precision. In this case, the positions of the motion search include nine positions in total: (1, 1), (1, 1.5) above (1, 1), (1, 0.5) below (1, 1), (0.5, 1) on the left, (1.5, 1) on the right, (1.5, 1.5) on the upper right, (1.5, 0.5) on the lower right, (0.5, 1.5) on the upper left, and (0.5, 0.5) on the lower left.

Motion search with the first precision may be performed on the forward prediction reference picture block based on the forward prediction motion vector, and a forward decoding prediction block obtained in each search is used as a second forward decoding prediction block, to obtain at least one second decoding prediction block. Then, motion search with the first precision is performed on the backward prediction reference picture block based on the backward prediction motion vector, and a backward decoding prediction block obtained in each search is used as a second backward decoding prediction block, to obtain at least one second decoding prediction block. The second decoding prediction block includes the second forward decoding prediction block and the second backward decoding prediction block. The first precision includes integer pixel precision, ½ pixel precision, ¼ pixel precision, or ⅛ pixel precision, which is not limited.

4. Calculate a difference between the first decoding prediction block and each second decoding prediction block, and use a motion vector between the to-be-decoded block and a second decoding prediction block with a minimum difference as a target prediction motion vector of the to-be-decoded block.

Difference comparison is performed between each second forward decoding prediction block and the first decoding prediction block, and a forward motion vector between the to-be-decoded block and a second forward decoding prediction block with a minimum difference as a target forward prediction motion vector. Difference comparison is performed between each second backward decoding prediction block and the first decoding prediction block, and a backward motion vector between the to-be-decoded block and a second backward decoding prediction block with a minimum difference as a target backward prediction motion vector. The target prediction motion vector includes the target forward prediction motion vector and the target backward prediction motion vector. During difference comparison, a sum of absolute values of all pixel differences in the two picture blocks may be used as a difference between the second decoding prediction block and the first decoding prediction block, or a sum of squares of all pixel differences in the two picture blocks may be used as a difference between the second decoding prediction block and the first decoding prediction block.

5. Perform bidirectional prediction on the to-be-decoded block based on the target prediction motion vector to obtain a third decoding prediction block of the to-be-decoded block.

Forward prediction is performed on the to-be-decoded block based on the target forward prediction motion vector to obtain a third forward decoding prediction block of the to-be-decoded block, and then backward prediction is performed on the to-be-decoded block based on the target backward prediction motion vector to obtain a third backward decoding prediction block of the to-be-decoded block.

6. Obtain a target decoding prediction block of the to-be-decoded block based on the third decoding prediction block, and decode the to-be-decoded block based on the target decoding prediction block.

Weighted summation may be performed on the third forward decoding prediction block and the third backward decoding prediction block to obtain the target decoding prediction block of the to-be-decoded block; or the third forward decoding prediction block may be used as the target decoding prediction block of the to-be-decoded block, or the third backward decoding prediction block may be used as the target decoding prediction block of the to-be-decoded block.

However, calculation complexity of the DMVR technology is comparatively high. The present disclosure provides a picture encoding and decoding method for a video sequence. The following provides detailed descriptions by using specific embodiments.

FIG. 1 is a flowchart of Embodiment 1 of a picture decoding method for a video sequence according to the present disclosure. As shown in FIG. 1, the method in this embodiment may include the following steps.

Step 101: Determine motion information of a to-be-decoded block, where the motion information includes a prediction motion vector and reference picture information, and the reference picture information is used to identify a prediction reference picture block.

As described above, the prediction motion vector obtained in step 1 of the inter prediction picture decoding method in the existing DMVR technology is coordinate information, and the coordinate information probably indicates a non-pixel point (located between two pixels). In this case, the non-pixel point can be obtained only through interpolation based on the two neighboring pixels.

In the present disclosure, the prediction motion vector is directly rounded up or down, so that the prediction motion vector obtained after rounding is corresponding to a location of a pixel. In this way, interpolation calculation is omitted, and a calculation amount and complexity are reduced.

Step 102: Obtain a first decoding prediction block of the to-be-decoded block based on the motion information.

A principle of step 102 in the present disclosure is similar to that of step 2 in the foregoing inter prediction picture decoding method in the DMVR technology, and details are not described herein again.

Step 103: Perform motion search with first precision in the prediction reference picture block to obtain at least two second decoding prediction blocks, where a search position of the motion search is determined based on the prediction motion vector and the first precision.

As described above, in the step 3 of the inter prediction picture decoding method in the existing DMVR technology, motion search is performed in first precision around a base block in the prediction reference picture block, to obtain at least nine second decoding prediction blocks. The nine second decoding prediction blocks include the base block, an upper block, a lower block, a left block, a right block, an upper left block, an upper right block, a lower right block, and a lower left block. The base block is obtained in the prediction reference picture block based on the prediction motion vector, the upper block is obtained in the prediction reference picture block based on a first prediction vector, the lower block is obtained in the prediction reference picture block based on a second prediction vector, the left block is obtained in the prediction reference picture block based on a third prediction vector, the right block is obtained in the prediction reference picture block based on a fourth prediction vector, the upper left block is obtained in the prediction reference picture block based on a fifth prediction vector, the upper right block is obtained in the prediction reference picture block based on a sixth prediction vector, the lower right block is obtained in the prediction reference picture block based on a seventh prediction vector, and the lower left block is obtained in the prediction reference picture block based on an eighth prediction vector. A position indicated by the first prediction vector is obtained by shifting a position indicated by the prediction motion vector upward by a target offset. A position indicated by the second prediction vector is obtained by shifting the position indicated by the prediction motion vector downward by the target offset. A position indicated by the third prediction vector is obtained by shifting a position indicated by the prediction motion vector leftward by the target offset. A position indicated by the fourth prediction vector is obtained by shifting the position indicated by the prediction motion vector rightward by the target offset. A position indicated by the fifth prediction vector is obtained by shifting the position indicated by the prediction motion vector leftward by the target offset and upward by the target offset. A position indicated by the sixth prediction vector is obtained by shifting the position indicated by the prediction motion vector rightward by the target offset and upward by the target offset. A position indicated by the seventh prediction vector is obtained by shifting the position indicated by the prediction motion vector rightward by the target offset and downward by the target offset. A position indicated by the eighth prediction vector is obtained by shifting the position indicated by the prediction motion vector leftward by the target offset and downward by the target offset. The target offset is determined based on the first precision.

Step 103 in the present disclosure may be implemented by using the following implementation methods.

A first method is based on an assumption that the at least two second decoding prediction blocks include a base block, an upper block, a lower block, a left block, and a right block. The lower block is excluded from the at least two second decoding prediction blocks when a difference corresponding to the upper block is less than a difference corresponding to the base block. Alternatively, the upper block is excluded from the at least two second decoding prediction blocks when a difference corresponding to the lower block is less than a difference corresponding to the base block.

The right block is excluded from the at least two second decoding prediction blocks when a difference corresponding to the left block is less than a difference corresponding to the base block. Alternatively, the left block is excluded from the at least two second decoding prediction blocks when a difference corresponding to the right block is less than a difference corresponding to the base block.

That is, one of the upper block and the lower block is selected, and one of the left block and the right block is selected. If a difference corresponding to a block is less than a difference corresponding to the base block, a block in an opposite direction does not need to be obtained. In this way, only second decoding prediction blocks at three positions need to be obtained. The difference in this step refers to a difference between the second decoding prediction block and the first decoding prediction block. Once it is found that a difference corresponding to one of the upper block and the lower block, and a difference corresponding to one of the left block and the right block are less than a difference corresponding to the base block, it indicates that the two blocks are closer to the to-be-decoded block than the base block. Therefore, blocks in opposite offset directions may no longer need to be obtained.

Further, when the lower block and the right block are excluded, an upper left block is obtained in the prediction reference picture block. The upper left block is one of the at least two second decoding prediction blocks. When the lower block and the left block are excluded, an upper right block is obtained in the prediction reference picture block. The upper right block is one of the at least two second decoding prediction blocks. When the upper block and the left block are excluded, a lower right block is obtained in the prediction reference picture block. The lower right block is one of the at least two second decoding prediction blocks. When the upper block and the right block are excluded, a lower left block is obtained in the prediction reference picture block. The lower left block is one of the at least two second decoding prediction blocks.

That is, on the basis of the second decoding prediction blocks at the foregoing two positions, one of the upper left block, the upper right block, the lower right block, and the lower left block may be further obtained. In this case, only second decoding prediction blocks at the four positions need to be obtained in total.

A second method is based on an assumption that the at least two second decoding prediction blocks include an upper block, a lower block, a left block, and a right block. When a difference corresponding to the upper block is less than a difference corresponding to the lower block, and a difference corresponding to the left block is less than a difference corresponding to the right block, an upper left block is obtained in the prediction reference picture block. The upper left block is one of the at least two second decoding prediction blocks. Alternatively, when a difference corresponding to the upper block is less than a difference corresponding to the lower block, and a difference corresponding to the right block is less than a difference corresponding to the left block, an upper right block is obtained in the prediction reference picture block. The upper right block is one of the at least two second decoding prediction blocks. Alternatively, when a difference corresponding to the lower block is less than a difference corresponding to the upper block, and a difference corresponding to the right block is less than a difference corresponding to the left block, a lower right block is obtained in the prediction reference picture block. The lower right block is one of the at least two second decoding prediction blocks. Alternatively, when a difference corresponding to the lower block is less than a difference corresponding to the upper block, and a difference corresponding to the left block is less than a difference corresponding to the right block, a lower left block is obtained in the prediction reference picture block. The lower left block is one of the at least two second decoding prediction blocks.

That is, the second decoding prediction blocks at the four positions are first obtained, and then one of the upper left block, the upper right block, the lower right block, and the lower left block is obtained based on the four second decoding prediction blocks. In this case, only the second decoding prediction blocks at the five positions need to be obtained in total.

Both the two methods in the present disclosure are based on a difference corresponding to a base block and differences corresponding to surrounding blocks of the base block. Once it is found that in two opposite directions, a difference corresponding to a block in one direction is less than a difference corresponding to a block in the other direction, or a difference corresponding to a block in one direction is less than a difference corresponding to the base block, a second decoding prediction block in the other direction or even an angular direction may not need to be obtained. In this way, a quantity of obtained second decoding prediction blocks is definitely less than the nine second decoding prediction blocks in other approaches. In addition, the decrease of the quantity of second decoding prediction blocks means that a calculation amount of subsequent pixel sampling and difference calculation is reduced, and complexity is reduced.

Figure 9:
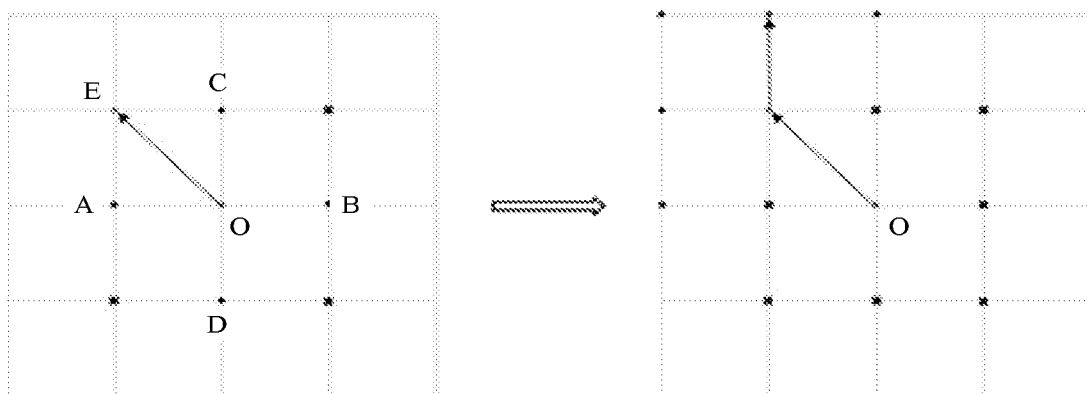
FIG. 9 is a schematic diagram of an example of determining a position of a search point according to an embodiment of the present disclosure.

In a feasible implementation, on the basis of the foregoing second method, it is set that differences corresponding to five second decoding prediction blocks in total in the upper direction, the lower direction, the left direction, the right direction, and one oblique direction are compared with a difference corresponding to the base block. A second decoding prediction block corresponding to a minimum difference is selected as a candidate prediction block, and a total of eight new second decoding prediction blocks in the upper, lower, left, and right directions and four oblique directions of the candidate prediction block are selected. Because some of the eight new second decoding prediction blocks are original second decoding prediction blocks and the base block, and difference calculation has been performed for these second decoding prediction blocks (as shown in FIG. 9, the new second decoding prediction block in the right direction and the new second decoding prediction block in the lower direction are original second decoding prediction blocks, and the new second decoding prediction block in the lower right oblique direction is the original base block), difference calculation is performed only on new second decoding prediction blocks that have not undergone difference calculation, and only differences corresponding to these new second decoding prediction blocks are compared with a difference corresponding to the candidate prediction block.

In a feasible implementation, when differences corresponding to four second decoding prediction blocks in the upper, lower, left, and right directions are compared with a difference corresponding to the base block and are all greater than or equal to a difference corresponding to the base block, the base block is selected as a prediction block, and a motion vector corresponding to the base block is used as a target motion vector.

In addition, as described above, after the at least one second decoding prediction block is obtained in step 3 of the inter prediction picture decoding method in the existing DMVR technology, even if a prediction motion vector corresponding to the base block represents a pixel, if the motion search precision is not an integer pixel, for example, ½ pixel precision, ¼ pixel precision, or ⅛ pixel precision, a prediction motion vector corresponding to a second decoding prediction block after shifting is likely to indicate a non-pixel point.

In the present disclosure, prediction motion vectors respectively corresponding to the at least two second decoding prediction blocks are rounded up or down, so as to be corresponding to locations of pixels. In this way, interpolation calculation is omitted, and a calculation amount and complexity are reduced.

Step 104: Perform downsampling on the first decoding prediction block to obtain a first sampling pixel array, and perform downsampling on the at least two second decoding prediction blocks to obtain at least two second sampling pixel arrays.

As described above, in step 4 of the inter prediction picture decoding method in the existing DMVR technology, a sum of absolute values of pixel differences between all pixels in the first decoding prediction block and all pixels in each second decoding prediction block is used as a difference between the two picture blocks, or a sum of squares of pixel differences between all pixels in the first decoding prediction block and all pixels in each second decoding prediction block may be used as the difference between the two picture blocks. In this case, a calculation amount is very large.

Because of association of images included in a picture, pixel values of two adjacent pixels in the picture do not differ greatly, and in particular, a sudden change of pixel values rarely occurs. Therefore, in the present disclosure, all pixels in a picture block are sampled, that is, only some pixels are selected from all pixels, for example, pixels in every other row are obtained, or pixels in every other column are obtained, or pixels in every other row and every other column are obtained. This is not limited. According to the disclosed embodiments, a same sampling rule is used for the first decoding prediction block and each second decoding prediction block. In this way, a quantity of pixels to be calculated is reduced, and a corresponding calculation amount is greatly reduced.

Step 105: Calculate a difference between the first sampling pixel array and each of the second sampling pixel arrays, and use, as a target prediction motion vector of the to-be-decoded block, a motion vector between the to-be-decoded block and a second decoding prediction block corresponding to a second sampling pixel array with a minimum difference.

Because the pixels in the first decoding prediction block and each second decoding prediction block are sampled, to calculate a difference between two picture blocks, a sum of absolute values of pixel differences of pixels in corresponding positions in the first sampling pixel array and each second sampling pixel array may be calculated, and the sum of the absolute values of the pixel differences is used as the difference between the first decoding prediction block and each second decoding prediction block, or a sum of squares of pixel differences of pixels in corresponding positions in the first sampling pixel array and each second sampling pixel array may be calculated, and the sum of the squares of the pixel differences is used as the difference between the first decoding prediction block and each second decoding prediction block. That is, calculation for all pixels in the two picture blocks is changed to calculation for some pixels in the two picture blocks, and a calculation amount is significantly reduced.

Step 106: Obtain a target decoding prediction block of the to-be-decoded block based on the target prediction motion vector, and decode the to-be-decoded block based on the target decoding prediction block.

As described above, in step 5 and step 6 of the inter prediction picture decoding method in the existing DMVR technology, motion search is performed in two major directions: a forward direction and a backward direction, and two target prediction motion vectors are respectively obtained in the forward direction and the backward direction. A same calculation process needs to be performed twice, and an amount of calculation is definitely huge.

In the present disclosure, after forward motion search is completed, a symmetric backward target prediction motion vector may be obtained based on a forward target prediction motion vector obtained through forward motion search, that is, a backward target decoding prediction block is obtained in a backward direction by using a value that is the same as the forward target prediction motion vector. In this way, the existing target prediction motion vector is directly used in the backward direction, so that a large amount of repeated calculation is not required, and a calculation amount is reduced.

In the present disclosure, a quantity of second decoding prediction blocks obtained by performing motion search on the prediction reference picture block is reduced, and pixels in the picture block are sampled, so that a calculation amount of difference comparison is reduced, and picture decoding efficiency is improved.

Figure 2:
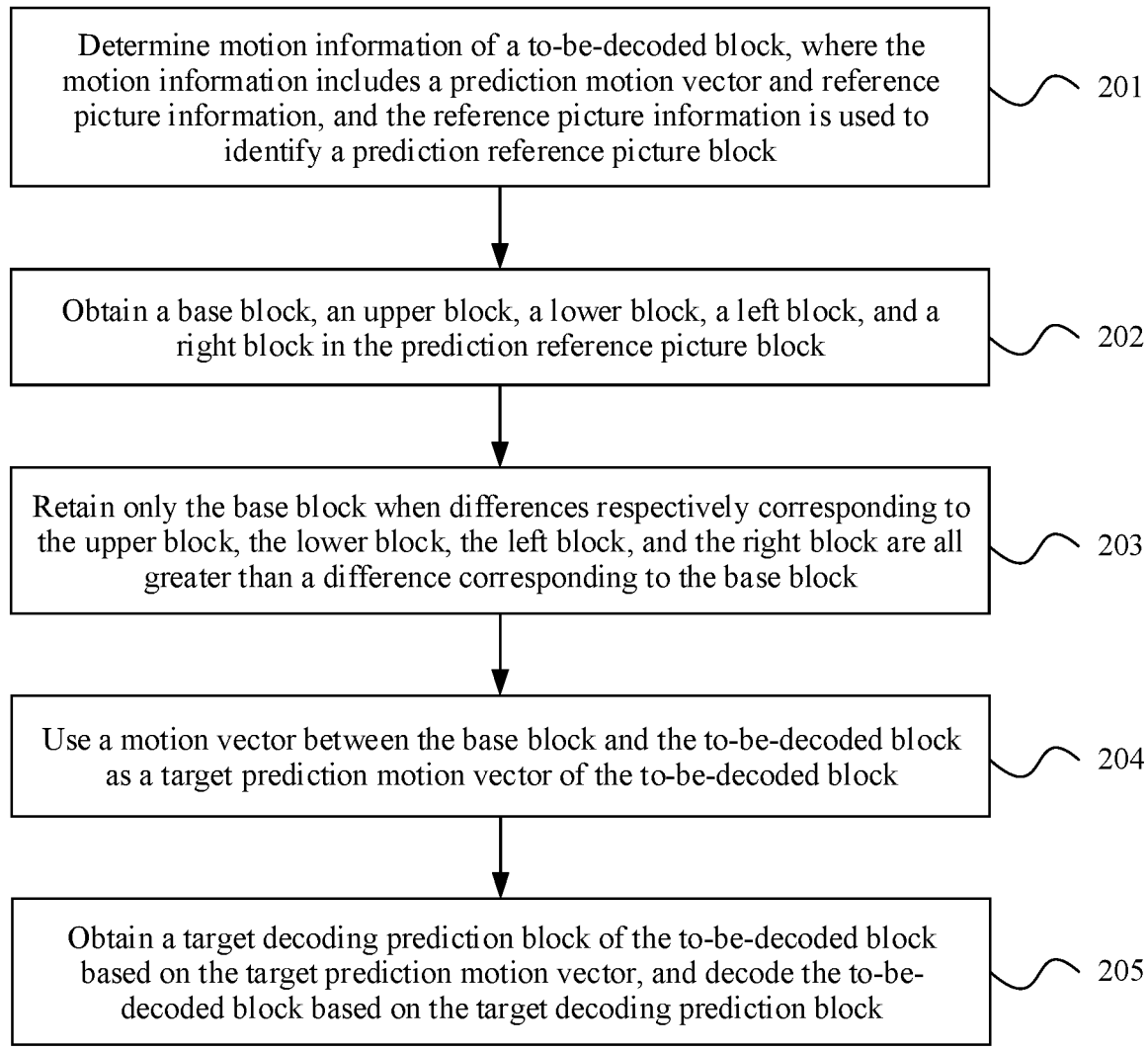
FIG. 2 is a flowchart of a picture decoding method for a video sequence according to an embodiment of the present disclosure.

FIG. 2 is a flowchart of Embodiment 2 of a picture decoding method for a video sequence according to the present disclosure. As shown in FIG. 2, the method in this embodiment may include the following steps.

Step 201: Determine motion information of a to-be-decoded block, where the motion information includes a prediction motion vector and reference picture information, and the reference picture information is used to identify a prediction reference picture block.

A principle of step 201 in the present disclosure is similar to that of step 101, and details are not described herein again.

Step 202: Obtain a base block, an upper block, a lower block, a left block, and a right block in the prediction reference picture block.

Step 203: Retain only the base block when differences respectively corresponding to the upper block, the lower block, the left block, and the right block are all greater than a difference corresponding to the base block.

Step 204: Use a motion vector between the base block and the to-be-decoded block as a target prediction motion vector of the to-be-decoded block.

The present disclosure is based on an assumption that at least two second decoding prediction blocks include a base block, an upper block, a lower block, a left block, and a right block. The base block, the upper block, the lower block, the left block, and the right block are first obtained, and then differences corresponding to other blocks are compared with a difference corresponding to the base block. When the differences respectively corresponding to the upper block, the lower block, the left block, and the right block are all greater than a difference corresponding to the base block, only the base block is retained. That is, the target prediction motion vector finally used for the to-be-decoded block can be directly determined by obtaining only the second decoding prediction blocks at the five positions. Once it is found that the differences respectively corresponding to the upper block, the lower block, the left block, and the right block are all greater than a difference corresponding to the base block, it indicates that none of the second decoding prediction blocks at the offset positions is closer to the to-be-decoded block than the base block. Therefore, the motion vector between the base block and the to-be-decoded block is directly used as the target prediction motion vector of the to-be-decoded block.

Step 205: Obtain a target decoding prediction block of the to-be-decoded block based on the target prediction motion vector, and decode the to-be-decoded block based on the target decoding prediction block.

A principle of step 205 in the present disclosure is similar to that of step 106, and details are not described herein again.

In the present disclosure, a quantity of second decoding prediction blocks obtained by performing motion search on the prediction reference picture block is reduced, so that a calculation amount of difference comparison is reduced, and picture decoding efficiency is improved.

Figure 3:
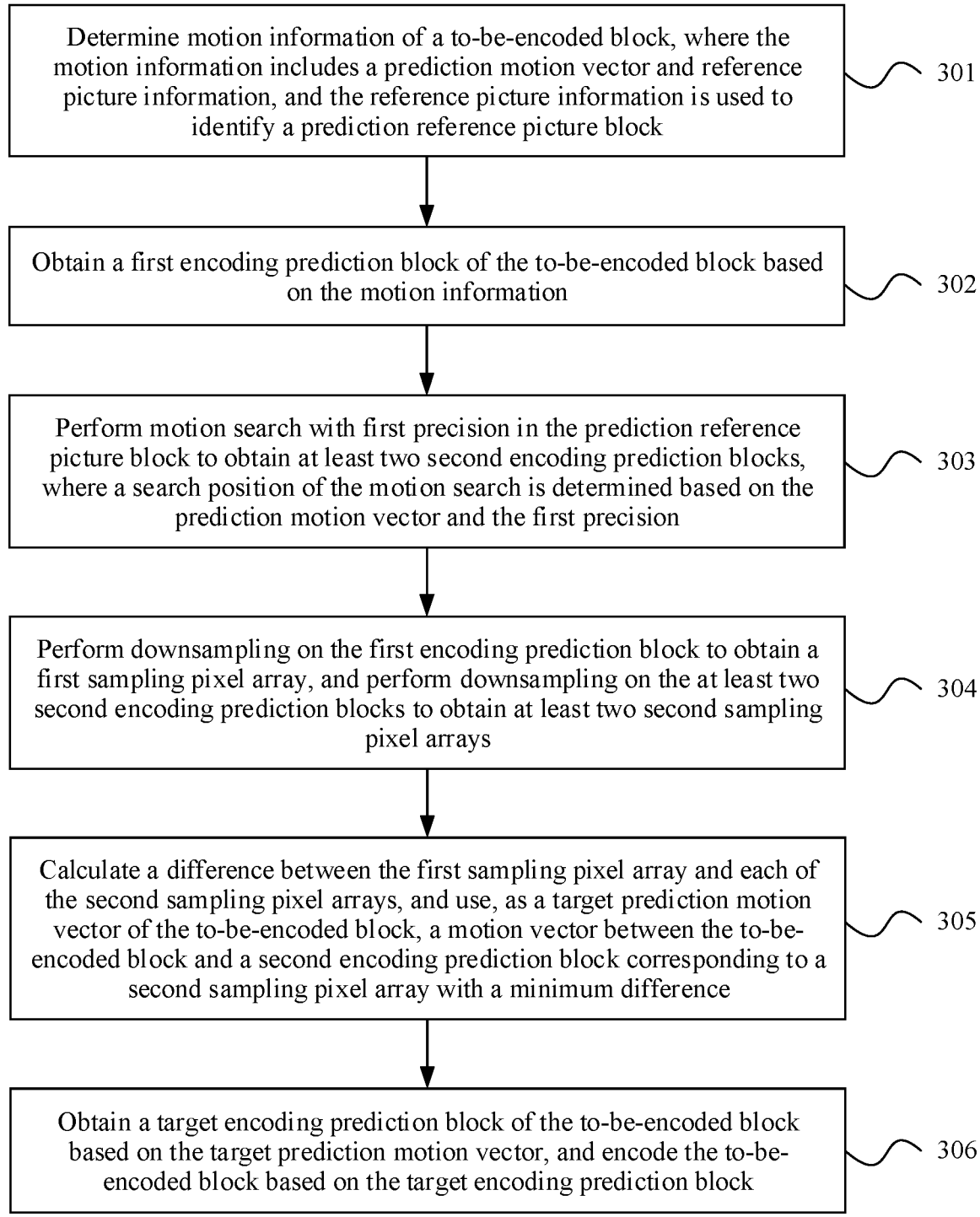
FIG. 3 is a flowchart of a picture encoding method for a video sequence according to an embodiment of the present disclosure.

FIG. 3 is a flowchart of Embodiment 1 of a picture encoding method for a video sequence according to the present disclosure. As shown in FIG. 3, the method in this embodiment may include the following steps.

Step 301: Determine motion information of a to-be-encoded block, where the motion information includes a prediction motion vector and reference picture information, and the reference picture information is used to identify a prediction reference picture block.

As described above, the prediction motion vector obtained in step 1 of the inter prediction picture encoding method in the existing DMVR technology is coordinate information, and the coordinate information probably indicates a non-pixel point (located between two pixels). In this case, the non-pixel point can be obtained only through interpolation based on the two neighboring pixels.

In the present disclosure, the prediction motion vector is directly rounded up or down, so as to be corresponding to a location of a pixel. In this way, interpolation calculation is omitted, and a calculation amount and complexity are reduced.

Step 302: Obtain a first encoding prediction block of the to-be-encoded block based on the motion information.

A principle of step 302 in the present disclosure is similar to that of step 2 in the foregoing inter prediction picture encoding method in the DMVR technology, and details are not described herein again.

Step 303: Perform motion search with first precision in the prediction reference picture block to obtain at least two second encoding prediction blocks, where a search position of the motion search is determined based on the prediction motion vector and the first precision.

As described above, in the step 3 of the inter prediction picture encoding method in the existing DMVR technology, motion search is performed in first precision around a base block in the prediction reference picture block, to obtain at least nine second encoding prediction blocks. The nine second encoding prediction blocks include the base block, an upper block, a lower block, a left block, a right block, an upper left block, an upper right block, a lower right block, and a lower left block. The base block is obtained in the prediction reference picture block based on the prediction motion vector, the upper block is obtained in the prediction reference picture block based on a first prediction vector, the lower block is obtained in the prediction reference picture block based on a second prediction vector, the left block is obtained in the prediction reference picture block based on a third prediction vector, the right block is obtained in the prediction reference picture block based on a fourth prediction vector, the upper left block is obtained in the prediction reference picture block based on a fifth prediction vector, the upper right block is obtained in the prediction reference picture block based on a sixth prediction vector, the lower right block is obtained in the prediction reference picture block based on a seventh prediction vector, and the lower left block is obtained in the prediction reference picture block based on an eighth prediction vector. A position indicated by the first prediction vector is obtained by shifting a position indicated by the prediction motion vector upward by a target offset. A position indicated by the second prediction vector is obtained by shifting the position indicated by the prediction motion vector downward by the target offset. A position indicated by the third prediction vector is obtained by shifting a position indicated by the prediction motion vector leftward by the target offset. A position indicated by the fourth prediction vector is obtained by shifting the position indicated by the prediction motion vector rightward by the target offset. A position indicated by the fifth prediction vector is obtained by shifting the position indicated by the prediction motion vector leftward by the target offset and upward by the target offset. A position indicated by the sixth prediction vector is obtained by shifting the position indicated by the prediction motion vector rightward by the target offset and upward by the target offset. A position indicated by the seventh prediction vector is obtained by shifting the position indicated by the prediction motion vector rightward by the target offset and downward by the target offset. A position indicated by the eighth prediction vector is obtained by shifting the position indicated by the prediction motion vector leftward by the target offset and downward by the target offset. The target offset is determined based on the first precision.

Step 303 in the present disclosure may be implemented by using the following implementation methods.

A first method is based on an assumption that the at least two second encoding prediction blocks include a base block, an upper block, a lower block, a left block, and a right block. The lower block is excluded from the at least two second encoding prediction blocks when a difference corresponding to the upper block is less than a difference corresponding to the base block. Alternatively, the upper block is excluded from the at least two second encoding prediction blocks when a difference corresponding to the lower block is less than a difference corresponding to the base block.

The right block is excluded from the at least two second encoding prediction blocks when a difference corresponding to the left block is less than a difference corresponding to the base block. Alternatively, the left block is excluded from the at least two second encoding prediction blocks when a difference corresponding to the right block is less than a difference corresponding to the base block.

That is, one of the upper block and the lower block is selected, and one of the left block and the right block is selected. If a difference corresponding to a block is less than a difference corresponding to the base block, a block in an opposite direction does not need to be obtained. In this way, only second encoding prediction blocks at three positions need to be obtained. The difference in this step refers to a difference between the second encoding prediction block and the first encoding prediction block. Once it is found that a difference corresponding to one of the upper block and the lower block, and a difference corresponding to one of the left block and the right block are less than a difference corresponding to the base block, it indicates that the two blocks are closer to the to-be-encoded block than the base block. Therefore, blocks in opposite offset directions may no longer need to be obtained.

Further, when the lower block and the right block are excluded, an upper left block is obtained in the prediction reference picture block. The upper left block is one of the at least two second encoding prediction blocks. When the lower block and the left block are excluded, an upper right block is obtained in the prediction reference picture block. The upper right block is one of the at least two second encoding prediction blocks. When the upper block and the left block are excluded, a lower right block is obtained in the prediction reference picture block. The lower right block is one of the at least two second encoding prediction blocks. When the upper block and the right block are excluded, a lower left block is obtained in the prediction reference picture block. The lower left block is one of the at least two second encoding prediction blocks.

That is, on the basis of the second encoding prediction blocks at the foregoing two positions, one of the upper left block, the upper right block, the lower right block, and the lower left block may be further obtained. In this case, only second encoding prediction blocks at the four positions need to be obtained in total.

A second method is based on an assumption that the at least two second encoding prediction blocks include an upper block, a lower block, a left block, and a right block. When a difference corresponding to the upper block is less than a difference corresponding to the lower block, and a difference corresponding to the left block is less than a difference corresponding to the right block, an upper left block is obtained in the prediction reference picture block. The upper left block is one of the at least two second encoding prediction blocks. Alternatively, when a difference corresponding to the upper block is less than a difference corresponding to the lower block, and a difference corresponding to the right block is less than a difference corresponding to the left block, an upper right block is obtained in the prediction reference picture block. The upper right block is one of the at least two second encoding prediction blocks. Alternatively, when a difference corresponding to the lower block is less than a difference corresponding to the upper block, and a difference corresponding to the right block is less than a difference corresponding to the left block, a lower right block is obtained in the prediction reference picture block. The lower right block is one of the at least two second encoding prediction blocks. Alternatively, when a difference corresponding to the lower block is less than a difference corresponding to the upper block, and a difference corresponding to the left block is less than a difference corresponding to the right block, a lower left block is obtained in the prediction reference picture block. The lower left block is one of the at least two second encoding prediction blocks.

That is, the second encoding prediction blocks at the four positions are first obtained, and then one of the upper left block, the upper right block, the lower right block, and the lower left block is obtained based on the four second encoding prediction blocks. In this case, only the second encoding prediction blocks at the five positions need to be obtained in total.

Both the two methods in the present disclosure are based on a difference corresponding to a base block and differences corresponding to surrounding blocks of the base block. Once it is found that in two opposite directions, a difference corresponding to a block in one direction is less than a difference corresponding to a block in the other direction, or a difference corresponding to a block in one direction is less than a difference corresponding to the base block, a second encoding prediction block in the other direction or even an angular direction may not need to be obtained. In this way, a quantity of obtained second encoding prediction blocks is definitely less than the nine second encoding prediction blocks in other approaches. In addition, the decrease of the quantity of second encoding prediction blocks means that a calculation amount of subsequent pixel sampling and difference calculation is reduced, and complexity is reduced.

In a feasible implementation, on the basis of the foregoing second method, it is set that differences corresponding to five second encoding prediction blocks in total in the upper direction, the lower direction, the left direction, the right direction, and one oblique direction are compared with a difference corresponding to the base block. A second encoding prediction block corresponding to a minimum difference is selected as a candidate prediction block, and a total of eight new second encoding prediction blocks in the upper, lower, left, and right directions and four oblique directions of the candidate prediction block are selected. Because some of the eight new second encoding prediction blocks are original second encoding prediction blocks and the base block, and difference calculation has been performed for these second encoding prediction blocks (as shown in FIG. 9, the new second encoding prediction block in the right direction and the new second encoding prediction block in the lower direction are original second encoding prediction blocks, and the new second encoding prediction block in the lower right oblique direction is the original base block), difference calculation is performed only on new second encoding prediction blocks that have not undergone difference calculation, and only differences corresponding to these new second encoding prediction blocks are compared with a difference corresponding to the candidate prediction block.

In a feasible implementation, when differences corresponding to four second encoding prediction blocks in the upper, lower, left, and right directions are compared with a difference corresponding to the base block and are all greater than or equal to a difference corresponding to the base block, the base block is selected as a prediction block, and a motion vector corresponding to the base block is used as a target motion vector.

In addition, as described above, after the at least one second encoding prediction block is obtained in step 3 of the inter prediction picture encoding method in the existing DMVR technology, even if a prediction motion vector corresponding to the base block represents a pixel, if the motion search precision is not an integer pixel, for example, ½ pixel precision, ¼ pixel precision, or ⅛ pixel precision, a prediction motion vector corresponding to a second encoding prediction block after shifting is likely to indicate a non-pixel point.

In the present disclosure, prediction motion vectors respectively corresponding to the at least two second encoding prediction blocks are rounded up or down, so as to be corresponding to locations of pixels. In this way, interpolation calculation is omitted, and a calculation amount and complexity are reduced.

Step 304: Perform downsampling on the first encoding prediction block to obtain a first sampling pixel array, and perform downsampling on the at least two second encoding prediction blocks to obtain at least two second sampling pixel arrays.

As described above, in step 4 of the inter prediction picture encoding method in the existing DMVR technology, a sum of absolute values of pixel differences between all pixels in the first encoding prediction block and all pixels in each second encoding prediction block is used as a difference between the two picture blocks, or a sum of squares of pixel differences between all pixels in the first encoding prediction block and all pixels in each second encoding prediction block may be used as the difference between the two picture blocks. In this case, a calculation amount is very large.

Because of association of images included in a picture, pixel values of two adjacent pixels in the picture do not differ greatly, and in particular, a sudden change of pixel values rarely occurs. Therefore, in the present disclosure, all pixels in a picture block are sampled, that is, only some pixels are selected from all pixels, for example, pixels in every other row are obtained, or pixels in every other column are obtained, or pixels in every other row and every other column are obtained. This is not limited. According to the disclosed embodiments, a same sampling rule is used for the first encoding prediction block and each second encoding prediction block. In this way, a quantity of pixels to be calculated is reduced, and a corresponding calculation amount is greatly reduced.

Step 305: Calculate a difference between the first sampling pixel array and each of the second sampling pixel arrays, and use, as a target prediction motion vector of the to-be-encoded block, a motion vector between the to-be-encoded block and a second encoding prediction block corresponding to a second sampling pixel array with a minimum difference.

Because the pixels in the first encoding prediction block and each second encoding prediction block are sampled, to calculate a difference between two picture blocks, a sum of absolute values of pixel differences of pixels in corresponding positions in the first sampling pixel array and each second sampling pixel array may be calculated, and the sum of the absolute values of the pixel differences is used as the difference between the first encoding prediction block and each second encoding prediction block, or a sum of squares of pixel differences of pixels in corresponding positions in the first sampling pixel array and each second sampling pixel array may be calculated, and the sum of the squares of the pixel differences is used as the difference between the first encoding prediction block and each second encoding prediction block. That is, calculation for all pixels in the two picture blocks is changed to calculation for some pixels in the two picture blocks, and a calculation amount is significantly reduced.

Step 306: Obtain a target encoding prediction block of the to-be-encoded block based on the target prediction motion vector, and encode the to-be-encoded block based on the target encoding prediction block.

As described above, in step 5 and step 6 of the inter prediction picture encoding method in the existing DMVR technology, motion search is performed in two major directions: a forward direction and a backward direction, and two target prediction motion vectors are respectively obtained in the forward direction and the backward direction. A same calculation process needs to be performed twice, and an amount of calculation is definitely huge.

In the present disclosure, after forward motion search is completed, a symmetric backward target prediction motion vector may be obtained based on a forward target prediction motion vector obtained through forward motion search, that is, a backward target encoding prediction block is obtained in a backward direction by using a value that is the same as the forward target prediction motion vector. In this way, the existing target prediction motion vector is directly used in the backward direction, so that a large amount of repeated calculation is not required, and a calculation amount is reduced.

In the present disclosure, a quantity of second encoding prediction blocks obtained by performing motion search on the prediction reference picture block is reduced, and pixels in the picture block are sampled, so that a calculation amount of difference comparison is reduced, and picture encoding efficiency is improved.

Figure 4:
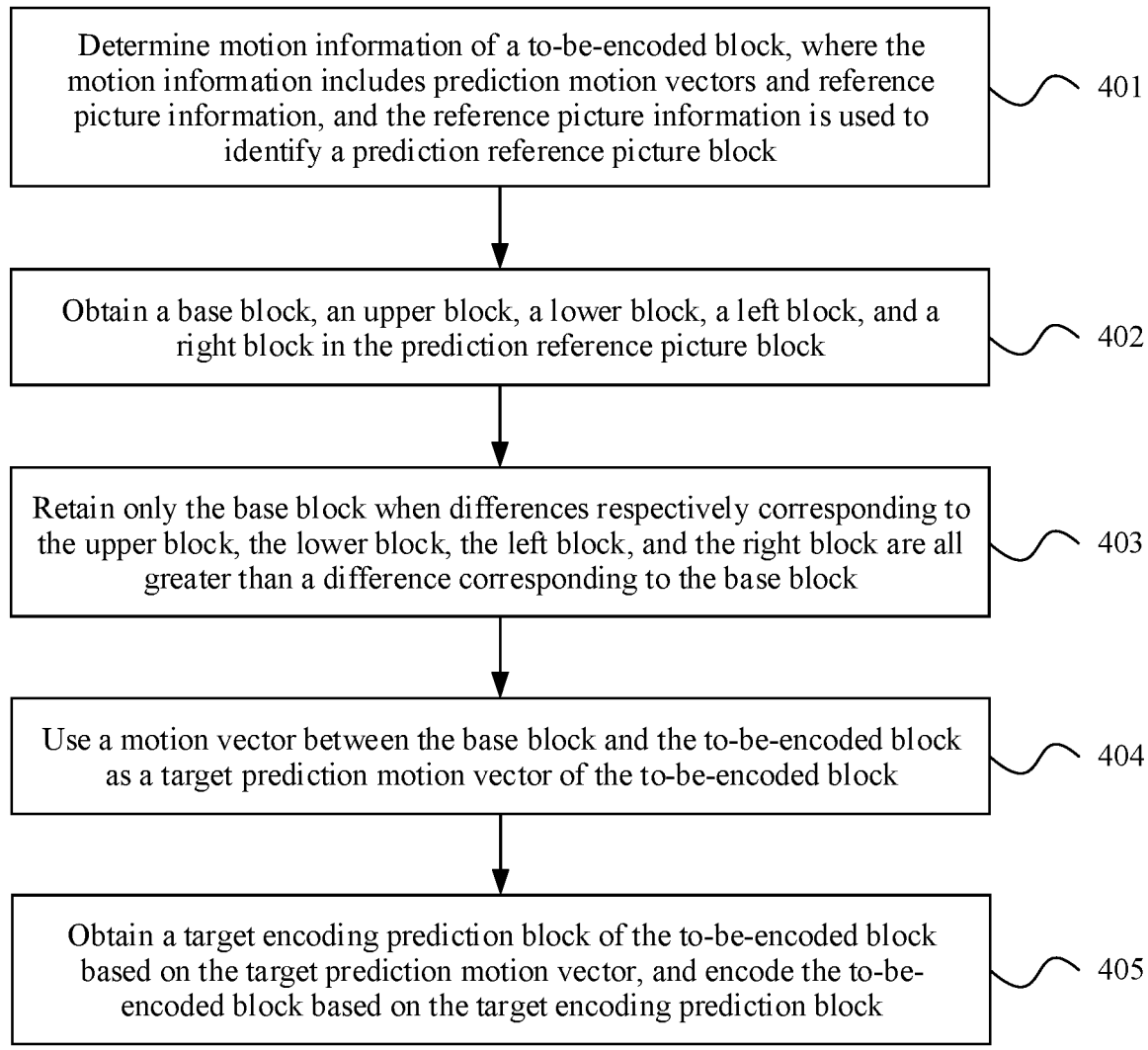
FIG. 4 is a flowchart of a picture encoding method for a video sequence according to an embodiment of the present disclosure.

FIG. 4 is a flowchart of Embodiment 2 of a picture encoding method for a video sequence according to the present disclosure. As shown in FIG. 4, the method in this embodiment may include the following steps.

Step 401: Determine motion information of a to-be-encoded block, where the motion information includes a prediction motion vector and reference picture information, and the reference picture information is used to identify a prediction reference picture block.

A principle of step 401 in the present disclosure is similar to that of step 301, and details are not described herein again.

Step 402: Obtain a base block, an upper block, a lower block, a left block, and a right block in the prediction reference picture block.

Step 403: Retain only the base block when differences respectively corresponding to the upper block, the lower block, the left block, and the right block are all greater than a difference corresponding to the base block.

Step 404: Use a motion vector between the base block and the to-be-encoded block as a target prediction motion vector of the to-be-encoded block.

The present disclosure is based on an assumption that at least two second encoding prediction blocks include a base block, an upper block, a lower block, a left block, and a right block. The base block, the upper block, the lower block, the left block, and the right block are first obtained, and then differences corresponding to other blocks are compared with a difference corresponding to the base block. When the differences respectively corresponding to the upper block, the lower block, the left block, and the right block are all greater than a difference corresponding to the base block, only the base block is retained. That is, the target prediction motion vector finally used for the to-be-encoded block can be directly determined by obtaining only the second encoding prediction blocks at the five positions. Once it is found that the differences respectively corresponding to the upper block, the lower block, the left block, and the right block are all greater than a difference corresponding to the base block, it indicates that none of the second encoding prediction blocks at the offset positions is closer to the to-be-encoded block than the base block. Therefore, the motion vector between the base block and the to-be-encoded block is directly used as the target prediction motion vector of the to-be-encoded block.

Step 405: Obtain a target encoding prediction block of the to-be-encoded block based on the target prediction motion vector, and encode the to-be-encoded block based on the target encoding prediction block.

A principle of step 405 in the present disclosure is similar to that of step 306, and details are not described herein again.

In the present disclosure, a quantity of second encoding prediction blocks obtained by performing motion search on the prediction reference picture block is reduced, so that a calculation amount of difference comparison is reduced, and picture encoding efficiency is improved.

Figure 5:
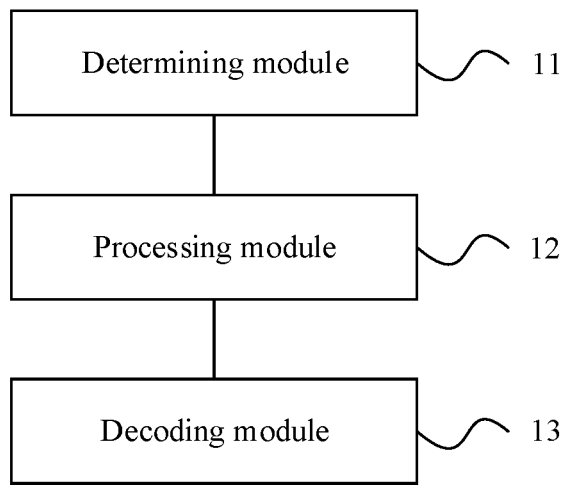
FIG. 5 is a schematic structural diagram of an embodiment of a picture decoding apparatus for a video sequence according to an embodiment of the present disclosure.

FIG. 5 is a schematic structural diagram of an embodiment of a picture decoding apparatus for a video sequence according to the present disclosure. As shown in FIG. 5, the apparatus in this embodiment may include a determining module 11, a processing module 12, and a decoding module 13. The determining module 11 is configured to determine motion information of a to-be-decoded block, where the motion information includes a prediction motion vector and reference picture information, and the reference picture information is used to identify a prediction reference picture block. The processing module 12 is configured to: obtain a first decoding prediction block of the to-be-decoded block based on the motion information, perform motion search with first precision in the prediction reference picture block to obtain at least two second decoding prediction blocks, where a search position of the motion search is determined based on the prediction motion vector and the first precision, perform downsampling on the first decoding prediction block to obtain a first sampling pixel array, perform downsampling on the at least two second decoding prediction blocks to obtain at least two second sampling pixel arrays, calculate a difference between the first sampling pixel array and each of the second sampling pixel arrays, and use, as a target prediction motion vector of the to-be-decoded block, a motion vector between the to-be-decoded block and a second decoding prediction block corresponding to a second sampling pixel array with a minimum difference. The decoding module 13 is configured to obtain a target decoding prediction block of the to-be-decoded block based on the target prediction motion vector, and decode the to-be-decoded block based on the target decoding prediction block.

Based on the foregoing technical solution, the processing module 12 is configured to: calculate a sum of absolute values of pixel differences of pixels at corresponding locations in the first sampling pixel array and each of the second sampling pixel arrays, and use the sum of the absolute values of the pixel differences as the difference, or calculate a sum of squares of pixel differences of pixels at corresponding locations in the first sampling pixel array and each of the second sampling pixel arrays, and use the sum of squares of the pixel differences as the difference.

Based on the foregoing technical solution, the at least two second decoding prediction blocks include a base block, an upper block, a lower block, a left block, and a right block, and the processing module 12 is configured to: exclude the lower block from the at least two second decoding prediction blocks when a difference corresponding to the upper block is less than a difference corresponding to the base block, where the base block is obtained in the prediction reference picture block based on the prediction motion vector, the upper block is obtained in the prediction reference picture block based on a first prediction vector, a position indicated by the first prediction vector is obtained by shifting a position indicated by the prediction motion vector upward by a target offset, the lower block is obtained in the prediction reference picture block based on a second prediction vector, a position indicated by the second prediction vector is obtained by shifting the position indicated by the prediction motion vector downward by the target offset, and the target offset is determined based on the first precision, or exclude the upper block from the at least two second decoding prediction blocks when a difference corresponding to the lower block is less than a difference corresponding to the base block, or exclude the right block from the at least two second decoding prediction blocks when a difference corresponding to the left block is less than a difference corresponding to the base block, where the left block is obtained in the prediction reference picture block based on a third prediction vector, a position indicated by the third prediction vector is obtained by shifting a position indicated by the prediction motion vector leftward by a target offset, the right block is obtained in the prediction reference picture block based on a fourth prediction vector, and a position indicated by the fourth prediction vector is obtained by shifting the position indicated by the prediction motion vector rightward by the target offset, or exclude the left block from the at least two second decoding prediction blocks when a difference corresponding to the right block is less than a difference corresponding to the base block.

Based on the foregoing technical solution, the processing module 12 is further configured to: when the lower block and the right block are excluded, obtain an upper left block in the prediction reference picture block based on a fifth prediction vector, where a position indicated by the fifth prediction vector is obtained by shifting the position indicated by the prediction motion vector leftward by the target offset and upward by the target offset, and the upper left block is one of the at least two second decoding prediction blocks, when the lower block and the left block are excluded, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second decoding prediction blocks, when the upper block and the left block are excluded, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second decoding prediction blocks, or when the upper block and the right block are excluded, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second decoding prediction blocks.

Based on the foregoing technical solution, the at least two second decoding prediction blocks include an upper block, a lower block, a left block, and a right block. The processing module 12 is configured to: when a difference corresponding to the upper block is less than a difference corresponding to the lower block, and a difference corresponding to the left block is less than a difference corresponding to the right block, obtain an upper left block in the prediction reference picture block based on a fifth prediction vector, where a position indicated by the fifth prediction vector is obtained by shifting a position indicated by the prediction motion vector leftward by the target offset and upward by the target offset, the upper left block is one of the at least two second decoding prediction blocks, the upper block is obtained in the prediction reference picture block based on a first prediction vector, and a position indicated by the first prediction vector is obtained by shifting the position indicated by the prediction motion vector upward by the target offset, the lower block is obtained in the prediction reference picture block based on a second prediction vector, and a position indicated by the second prediction vector is obtained by shifting the position indicated by the prediction motion vector downward by the target offset, the left block is obtained in the prediction reference picture block based on a third prediction vector, and a position indicated by the third prediction vector is obtained by shifting the position indicated by the prediction motion vector leftward by the target offset, the right block is obtained in the prediction reference picture block based on a fourth prediction vector, and a position indicated by the fourth prediction vector is obtained by shifting the position indicated by the prediction motion vector rightward by the target offset, and the target offset is determined based on the first precision, or when a difference corresponding to the upper block is less than a difference corresponding to the lower block, and a difference corresponding to the right block is less than a difference corresponding to the left block, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second decoding prediction blocks, or when a difference corresponding to the lower block is less than a difference corresponding to the upper block, and a difference corresponding to the right block is less than a difference corresponding to the left block, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second decoding prediction blocks, or when a difference corresponding to the lower block is less than a difference corresponding to the upper block, and a difference corresponding to the left block is less than a difference corresponding to the right block, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second decoding prediction blocks.

Based on the foregoing technical solution, the processing module 12 is further configured to round up or down the motion vector.

Based on the foregoing technical solution, the processing module 12 is further configured to round up or down prediction motion vectors respectively corresponding to the at least two second decoding prediction blocks.

The apparatus in this embodiment may be configured to execute the technical solution in the method embodiment shown in FIG. 1 or FIG. 2. The implementation principles and technical effects thereof are similar. Details are not described herein again.

Figure 6:
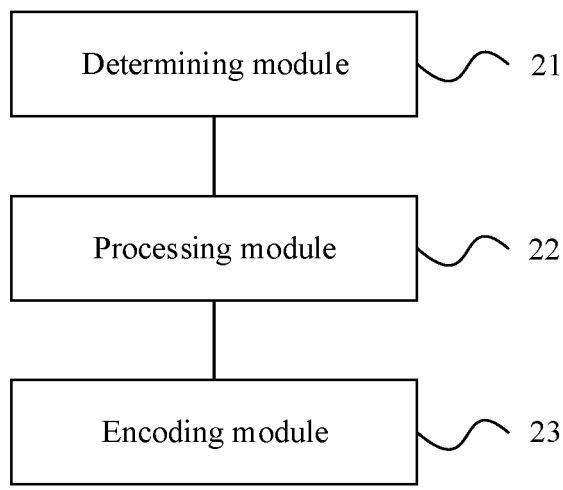
FIG. 6 is a schematic structural diagram of an embodiment of a picture encoding apparatus for a video sequence according to an embodiment of the present disclosure.

FIG. 6 is a schematic structural diagram of an embodiment of a picture encoding apparatus for a video sequence according to the present disclosure. As shown in FIG. 6, the apparatus in this embodiment may include a determining module 21, a processing module 22, and an encoding module 23. The determining module 21 is configured to determine motion information of a to-be-encoded block, where the motion information includes a prediction motion vector and reference picture information, and the reference picture information is used to identify a prediction reference picture block. The processing module 22 is configured to: obtain a first encoding prediction block of the to-be-encoded block based on the motion information, perform motion search with first precision in the prediction reference picture block to obtain at least two second encoding prediction blocks, where a search position of the motion search is determined based on the prediction motion vector and the first precision, perform downsampling on the first encoding prediction block to obtain a first sampling pixel array, perform downsampling on the at least two second encoding prediction blocks to obtain at least two second sampling pixel arrays, calculate a difference between the first sampling pixel array and each of the second sampling pixel arrays, and use, as a target prediction motion vector of the to-be-encoded block, a motion vector between the to-be-encoded block and a second encoding prediction block corresponding to a second sampling pixel array with a minimum difference. The encoding module 23 is configured to obtain a target encoding prediction block of the to-be-encoded block based on the target prediction motion vector, and encode the to-be-encoded block based on the target encoding prediction block.

Based on the foregoing technical solution, the processing module 22 is configured to: calculate a sum of absolute values of pixel differences of pixels at corresponding locations in the first sampling pixel array and each of the second sampling pixel arrays, and use the sum of the absolute values of the pixel differences as the difference, or calculate a sum of squares of pixel differences of pixels at corresponding locations in the first sampling pixel array and each of the second sampling pixel arrays, and use the sum of squares of the pixel differences as the difference.

Based on the foregoing technical solution, the at least two second encoding prediction blocks include a base block, an upper block, a lower block, a left block, and a right block, and the processing module 22 is configured to: exclude the lower block from the at least two second encoding prediction blocks when a difference corresponding to the upper block is less than a difference corresponding to the base block, where the base block is obtained in the prediction reference picture block based on the prediction motion vector, the upper block is obtained in the prediction reference picture block based on a first prediction vector, a position indicated by the first prediction vector is obtained by shifting a position indicated by the prediction motion vector upward by a target offset, the lower block is obtained in the prediction reference picture block based on a second prediction vector, a position indicated by the second prediction vector is obtained by shifting the position indicated by the prediction motion vector downward by the target offset, and the target offset is determined based on the first precision, or exclude the upper block from the at least two second encoding prediction blocks when a difference corresponding to the lower block is less than a difference corresponding to the base block, or exclude the right block from the at least two second encoding prediction blocks when a difference corresponding to the left block is less than a difference corresponding to the base block, where the left block is obtained in the prediction reference picture block based on a third prediction vector, a position indicated by the third prediction vector is obtained by shifting a position indicated by the prediction motion vector leftward by a target offset, the right block is obtained in the prediction reference picture block based on a fourth prediction vector, and a position indicated by the fourth prediction vector is obtained by shifting the position indicated by the prediction motion vector rightward by the target offset, or exclude the left block from the at least two second encoding prediction blocks when a difference corresponding to the right block is less than a difference corresponding to the base block.

Based on the foregoing technical solution, the processing module 22 is further configured to: when the lower block and the right block are excluded, obtain an upper left block in the prediction reference picture block based on a fifth prediction vector, where a position indicated by the fifth prediction vector is obtained by shifting the position indicated by the prediction motion vector leftward by the target offset and upward by the target offset, and the upper left block is one of the at least two second encoding prediction blocks, when the lower block and the left block are excluded, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second encoding prediction blocks, when the upper block and the left block are excluded, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second encoding prediction blocks, or when the upper block and the right block are excluded, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second encoding prediction blocks.

Based on the foregoing technical solution, the at least two second encoding prediction blocks include an upper block, a lower block, a left block, and a right block. The processing module 22 is configured to: when a difference corresponding to the upper block is less than a difference corresponding to the lower block, and a difference corresponding to the left block is less than a difference corresponding to the right block, obtain an upper left block in the prediction reference picture block based on a fifth prediction vector, where a position indicated by the fifth prediction vector is obtained by shifting a position indicated by the prediction motion vector leftward by the target offset and upward by the target offset, the upper left block is one of the at least two second encoding prediction blocks, the upper block is obtained in the prediction reference picture block based on a first prediction vector, and a position indicated by the first prediction vector is obtained by shifting the position indicated by the prediction motion vector upward by the target offset, the lower block is obtained in the prediction reference picture block based on a second prediction vector, and a position indicated by the second prediction vector is obtained by shifting the position indicated by the prediction motion vector downward by the target offset, the left block is obtained in the prediction reference picture block based on a third prediction vector, and a position indicated by the third prediction vector is obtained by shifting the position indicated by the prediction motion vector leftward by the target offset, the right block is obtained in the prediction reference picture block based on a fourth prediction vector, and a position indicated by the fourth prediction vector is obtained by shifting the position indicated by the prediction motion vector rightward by the target offset, and the target offset is determined based on the first precision, or when a difference corresponding to the upper block is less than a difference corresponding to the lower block, and a difference corresponding to the right block is less than a difference corresponding to the left block, obtain an upper right block in the prediction reference picture block based on a sixth prediction vector, where a position indicated by the sixth prediction vector is obtained by shifting the position indicated by the prediction motion vector rightward by the target offset and upward by the target offset, and the upper right block is one of the at least two second encoding prediction blocks, or when a difference corresponding to the lower block is less than a difference corresponding to the upper block, and a difference corresponding to the right block is less than a difference corresponding to the left block, obtain a lower right block in the prediction reference picture block based on a seventh prediction vector, where a position indicated by the seventh prediction vector is obtained by shifting the position indicated by the prediction motion vector rightward by the target offset and downward by the target offset, and the lower right block is one of the at least two second encoding prediction blocks, or when a difference corresponding to the lower block is less than a difference corresponding to the upper block, and a difference corresponding to the left block is less than a difference corresponding to the right block, obtain a lower left block in the prediction reference picture block based on an eighth prediction vector, where a position indicated by the eighth prediction vector is obtained by shifting the position indicated by the prediction motion vector leftward by the target offset and downward by the target offset, and the lower left block is one of the at least two second encoding prediction blocks.

Based on the foregoing technical solution, the processing module 22 is further configured to round up or down the motion vector.

Based on the foregoing technical solution, the processing module 22 is further configured to round up or down prediction motion vectors respectively corresponding to the at least two second encoding prediction blocks.

The apparatus in this embodiment may be configured to execute the technical solution in the method embodiment shown in FIG. 3 or FIG. 4. The implementation principles and technical effects are similar, and are not further described herein.

Figure 7:
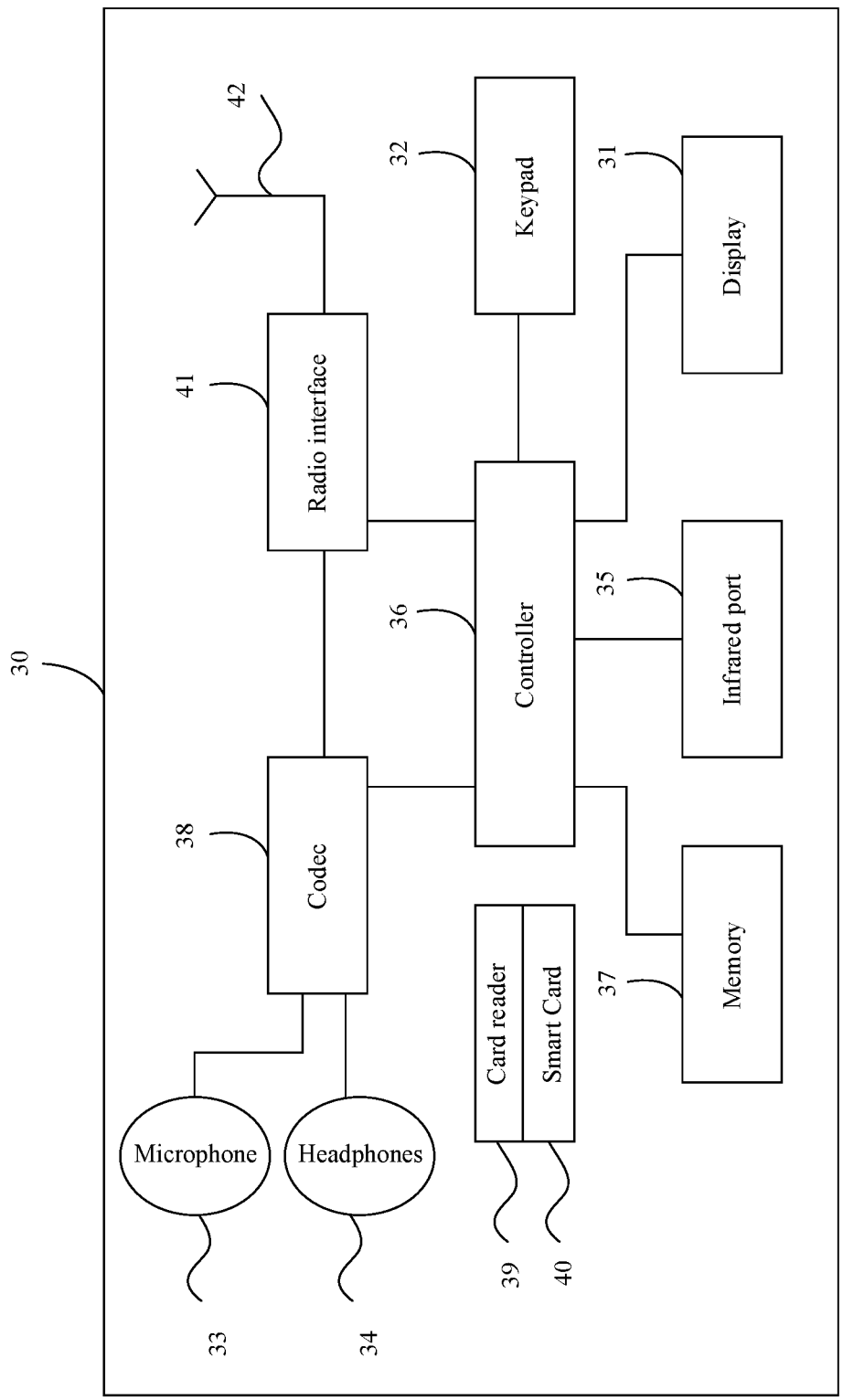
FIG. 7 is a schematic structural diagram of an embodiment of a codec device according to an embodiment of the present disclosure.
Figure 8:
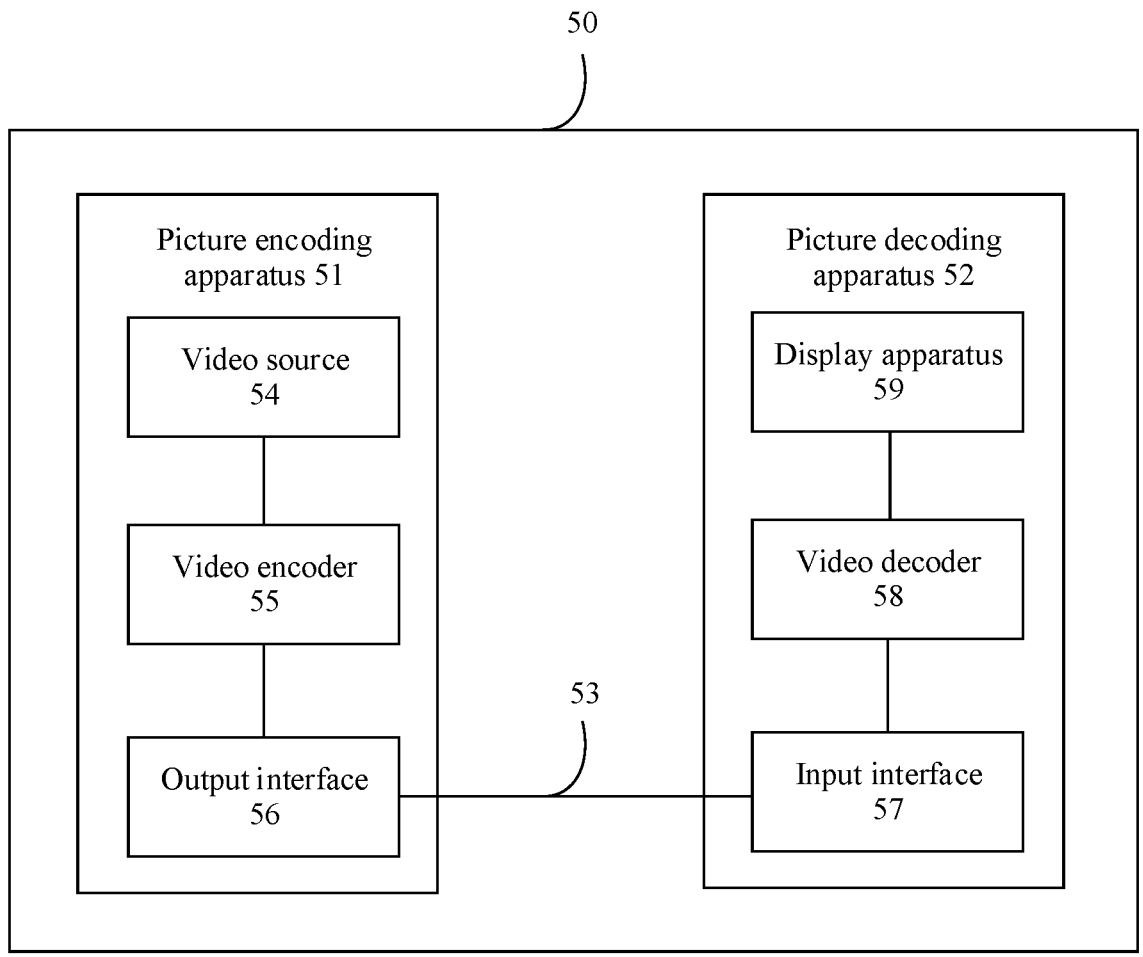
FIG. 8 is a schematic structural diagram of an embodiment of a codec system according to an embodiment of the present disclosure.

FIG. 7 is a schematic structural diagram of an embodiment of a codec device according to the present disclosure. FIG. 8 is a schematic structural diagram of an embodiment of a codec system according to the present disclosure. The following describes units in FIG. 7 and FIG. 8.

The codec device 30 may be, for example, a mobile terminal or user equipment in a wireless communications system. It should be understood that the embodiments of the present disclosure may be implemented in any electronic device or apparatus that may need to encode and decode, or encode, or decode a video picture.

The codec device 30 may include a housing for accommodating and protecting the device. The codec device 30 may further include a display 31 in a form of a liquid crystal display. In another embodiment of the present disclosure, the display 31 may use any appropriate display technology suitable for displaying a picture or a video. The codec device 30 may further include a keypad 32. In another embodiment of the present disclosure, any appropriate data or user interface mechanism may be used. For example, a user interface may be implemented as a virtual keyboard, or a data recording system may be implemented as a part of a touch-sensitive display. The codec device 30 may further include a microphone 33 or any appropriate audio input, and the audio input may be digital or analog signal input. The codec device 30 may further include the following audio output device, and in this embodiment of the present disclosure, the audio output device may be any one of an earphone 34, a loudspeaker, an analog audio output connection, or a digital audio output connection. The codec device 30 may further include a battery. In another embodiment of the present disclosure, the codec device 30 may be powered by any appropriate mobile energy device such as a solar cell, a fuel cell, or a clock mechanism generator. The codec device 30 may further include an infrared port 35 used for short-range line-of-sight communication with another device. In other embodiments, the codec device 30 may further include any appropriate short-range communication solution such as a Bluetooth wireless connection or a Universal Serial Bus (USB)/live line wired connection.

The codec device 30 may include a controller 36 or a controller configured to control the codec device 30. The controller 36 may be connected to a memory 37. In this embodiment of the present disclosure, the memory 37 may store data in a form of an image and data in a form of audio, and/or may store an instruction to be implemented by the controller 36. The controller 36 may be further connected to a codec 38 that is suitable for implementing audio and/or video data encoding and decoding, or for aided encoding and decoding that are implemented by the controller 36.

The codec device 30 may further include a card reader 39 and a smart card 40 that are configured to provide user information and are suitable for providing information used for network authentication and authorized user authentication.

The codec device 30 may further include a radio interface 41. The radio interface 41 is connected to the controller and is suitable for generating, for example, a wireless communication signal used for communication with a cellular communications network, a wireless communications system, or a wireless local area network. The codec device 30 may further include an antenna 42. The antenna is connected to the radio interface 41, and is configured to: send, to another apparatus (or a plurality of apparatuses), a radio frequency signal generated in the radio interface 41, and receive a radio frequency signal from another apparatus (or a plurality of apparatuses).

In some embodiments of the present disclosure, the codec device 30 includes a camera that can record or detect single frames, and the codec 38 or the controller receives and processes these single frames. In some embodiments of the present disclosure, the apparatus may receive to-be-processed video picture data from another device before transmission and/or storage. In some embodiments of the present disclosure, the codec device 30 may receive, through a wireless or wired connection, a picture to be encoded/decoded.

The codec system 50 includes a picture encoding apparatus 51 and a picture decoding apparatus 52. The picture encoding apparatus 51 generates encoded video data. Therefore, the picture encoding apparatus 51 may be referred to as an encoding device. The picture decoding apparatus 52 may decode the encoded video data generated by the picture encoding apparatus 51. Therefore, the picture decoding apparatus 52 may be referred to as a decoding device. The picture encoding apparatus 51 and the picture decoding apparatus 52 may be examples of the codec device. The picture encoding apparatus 51 and the picture decoding apparatus 52 may include a wide range of apparatuses, including a desktop computer, a mobile computing apparatus, a notebook (for example, laptop) computer, a tablet computer, a set top box, a handheld phone such as a smartphone, a television, a camera, a display apparatus, a digital media player, a video game console, an in-vehicle computer, or other similar apparatuses.

The picture decoding apparatus 52 may receive the encoded video data from the picture encoding apparatus 51 through a channel 53. The channel 53 may include one or more media and/or apparatuses capable of moving the encoded video data from the picture encoding apparatus 51 to the picture decoding apparatus 52. In an example, the channel 53 may include one or more communications media that can enable the picture encoding apparatus 51 to directly transmit the encoded video data to the picture decoding apparatus 52 in real time. In this example, the picture encoding apparatus 51 may modulate the encoded video data according to a communications standard (for example, a wireless communications protocol), and may transmit the modulated video data to the picture decoding apparatus 52. The one or more communications media may include wireless and/or wired communications media, for example, a radio frequency (RF) spectrum or one or more physical transmission lines. The one or more communications media may constitute a part of a packet-based network (for example, a local area network, a wide area network, or a global network (for example, the internet)). The one or more communications media may include a router, a switch, a base station, or another device that facilitates communication from the picture encoding apparatus 51 to the picture decoding apparatus 52.

In another example, the channel 53 may include a storage medium that stores the encoded video data generated by the picture encoding apparatus 51. In this example, the picture decoding apparatus 52 may access the storage medium through disk access or card access. The storage medium may include a plurality of locally accessible data storage media such as Blu-ray, a digital versatile disc (DVD), a compact disc (CD) read-only memory (ROM) (CD-ROM), a flash memory, or another suitable digital storage medium configured to store encoded video data.

In another example, the channel 53 may include a file server or another intermediate storage apparatus that stores the encoded video data generated by the picture encoding apparatus 51. In this example, the picture decoding apparatus 52 may access, through streaming transmission or downloading, the encoded video data stored in the file server or the other intermediate storage apparatus. The file server may be of a server type that can store the encoded video data and transmit the encoded video data to the picture decoding apparatus 52. For example, the file server includes a web server (for example, used for a website), a file transfer protocol (FTP) server, a network attached storage (NAS) apparatus, and a local disk drive.

The picture decoding apparatus 52 may access the encoded video data through a standard data connection (for example, an internet connection). An example type of the data connection includes a wireless channel (for example, a Wi-Fi connection) that is suitable for accessing the encoded video data stored in the file server, a wired connection (for example, a digital subscriber line (DSL) or a cable modem), or a combination thereof. Transmission of the encoded video data from the file server may be streaming transmission, download transmission, or a combination thereof.

The technology of the present disclosure is not limited to a wireless application scenario. For example, the technology may be applied to video encoding and decoding in a plurality of multimedia applications that support the following applications: over-the-air television broadcasting, cable television transmission, satellite television transmission, streaming-transmission video transmission (for example, through the internet), encoding of video data stored in a data storage medium, decoding of video data stored in a data storage medium, or another application. In some examples, the codec system 50 may be configured to support unidirectional or bidirectional video transmission, to support applications such as streaming video transmission, video playing, video broadcasting, and/or videotelephony.

In the example in FIG. 8, the picture encoding apparatus 51 includes a video source 54, a video encoder 55, and an output interface 56. In some examples, the output interface 56 may include a modulator/demodulator (modem) and/or a transmitter. The video source 54 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 55 may encode video data from the video source 54. In some examples, the picture encoding apparatus 51 directly transmits the encoded video data to the picture decoding apparatus 52 through the output interface 56. The encoded video data may further be stored in a storage medium or a file server, so that the picture decoding apparatus 52 accesses the encoded video data later for decoding and/or playing.

In the example in FIG. 8, the picture decoding apparatus 52 includes an input interface 57, a video decoder 58, and a display apparatus 59. In some examples, the input interface 57 includes a receiver and/or a modem. The input interface 57 may receive the encoded video data through the channel 53. The display apparatus 59 may be integrated with the picture decoding apparatus 52 or may be outside the picture decoding apparatus 52. Usually, the display apparatus 59 displays decoded video data. The display apparatus 59 may include a plurality of types of display apparatuses such as a liquid-crystal display (LCD), a plasma display, an organic light-emitting diode (OLED) display, or a display apparatus of another type.

The video encoder 55 and the video decoder 58 may operate according to a video compression standard (for example, the high efficiency video coding H.265 standard), and may comply with the High Efficiency Video Coding (HEVC) test model (HM). The text description International Telecommunication Union Telecommunication Standardization Sector (ITU-T) H.265 (V3) (April 2015) of the H.265 standard is released on Apr. 29, 2015, and may be downloaded from http://handle.itu.int/11.1002/1000/12455. The file is incorporated by reference in its entirety.

Alternatively, the video encoder 55 and video decoder 59 can perform operations according to other proprietary or industry standards, and the standards include ITU-T H.261, International Organization for Standardization (ISO)/International Electrotechnical Commission (IEC) Moving Picture Experts Group-1 (MPEG-1) Visual, ITU-T H.262 or ISO/IECMPEG-2 Visual, ITU-T H.263, ISO/IECMPEG-4 Visual, ITU-T H.264 (also referred to as ISO/IECMPEG-4 Advanced Video Coding (AVC)), and include scalable video coding (SVC) extension and multi-view video coding (MVC) extension. It should be understood that the technology of the present disclosure is not limited to any specific coding/decoding standard or technology.

In addition, FIG. 8 is merely an example, and the technology of the present disclosure may be applied to a video encoding/decoding application (for example, single-side video encoding or single-side video decoding) that not necessarily includes any data communication between an encoding apparatus and a decoding apparatus. In another example, data is retrieved from a local memory, and the data is transmitted through streaming by using a network or the data is operated in a similar manner. The encoding apparatus may encode data and store the data in the memory, and/or the decoding apparatus may retrieve data from the memory and decode the data. In many examples, a plurality of apparatuses that do not communicate with each other and that only encode data into the memory, and/or that only retrieve data from the memory and decode the data perform encoding and decoding.

The video encoder 55 and the video decoder 59 each may be implemented as any one of a plurality of proper circuits, such as one or more micro controller units, a digital signal processor (DSP), an application-specific integrated circuit (ASIC), a field-programmable gate array (FPGA), discrete logic, hardware, or any combination thereof. If the technology is partially or completely implemented by using software, the apparatus may store instructions of the software in an appropriate non-transitory computer-readable storage medium, and one or more processors may be used to execute instructions in hardware to execute the technology of the present disclosure. Any one of the foregoing items (including hardware, software, a combination of hardware and software, and the like) may be considered as one or more controllers. The video encoder 55 and the video decoder 59 each may be included in one or more encoders or decoders, and each may be integrated as a part of a combined encoder/decoder (codec) of another apparatus.

The present disclosure may generally indicate that specific information is "signaled" by the video encoder 55 to another apparatus (for example, the video decoder 59). The term "signaled" may generally indicate a syntactic element and/or represent transfer of encoded video data. The transfer may occur in real time or approximately in real time. Alternatively, the communication may occur over a time span, for example, may occur when the syntax element is stored, during coding, in a computer-readable storage medium by using binary data obtained after coding. The decoding apparatus may retrieve the syntax element at any time after the syntax element is stored in the medium.

In a possible implementation, the present disclosure provides a computer-readable storage medium. The computer-readable storage medium stores instructions, and when the instructions are run on a computer, the computer is configured to perform the method in any embodiment shown in FIG. 1 to FIG. 4.

In a possible implementation, the present disclosure provides a computer program. When the computer program is executed by a computer, the computer is configured to perform the method in any embodiment shown in FIG. 1 to FIG. 4.

A person of ordinary skill in the art may understand that all or some of the steps in the foregoing method embodiments may be implemented by program-instructing related hardware. The program may be stored in a computer-readable storage medium. When the program is executed, the steps in the foregoing method embodiments are performed. The foregoing storage medium includes any medium that can store program code, such as a ROM, a random-access memory (RAM), a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method comprising:

determining motion information of a to-be-encoded block, wherein the motion information comprises prediction motion vectors and prediction reference pictures, wherein the prediction motion vectors comprise a first base prediction motion vector and a second base prediction motion vector, and wherein the prediction reference pictures comprise a first prediction reference picture and a second prediction reference picture;

obtaining a first plurality of encoding prediction blocks of the to-be-encoded block based on the prediction motion vectors;

obtaining a second plurality of encoding prediction blocks of the to-be-encoded block, wherein the first plurality of encoding prediction blocks is in a one-to-one correspondence with the second plurality of encoding prediction blocks;

performing downsampling on the first plurality of encoding prediction blocks to obtain downsampled first encoding prediction blocks;

performing downsampling on the second plurality of encoding prediction blocks to obtain downsampled second encoding prediction blocks;

calculating a plurality of differences between the downsampled first encoding prediction blocks and the downsampled second encoding prediction blocks;

determining a minimum difference in the plurality of differences;

determining a first target prediction motion vector based on the minimum difference;

deriving a second target prediction motion vector based on the first target prediction motion vector;

obtaining a first target encoding prediction block of the to-be-encoded block based on the first target prediction motion vector;

obtaining a second target encoding prediction block of the to-be-encoded block based on the second target prediction motion vector; and encoding, based on the first target encoding prediction block and the second target encoding prediction block, the to-be-encoded block into a bitstream.

2. The method of claim 1, wherein the first target prediction motion vector is a forward target prediction motion vector and the second target prediction motion vector is a backward target prediction motion vector, or the first target prediction motion vector is a backward target prediction motion vector and the second target prediction motion vector is a forward target prediction motion vector.

3. The method of claim 1, wherein determining the first target prediction motion vector comprises:

determining a first offset motion vector of the first target prediction motion vector based on the minimum difference; and determining the first target prediction motion vector based on the first offset motion vector and the first base prediction motion vector.

4. The method of claim 3, wherein deriving the second target prediction motion vector comprises:

deriving a second offset motion vector of the second target prediction motion vector based on the first offset motion vector; and determining the second target prediction motion vector based on the second offset motion vector and the second base prediction motion vector.

5. The method of claim 1, wherein the differences between the downsampled first encoding prediction blocks and the downsampled second encoding prediction blocks comprise:

a sum of absolute values of pixel differences of pixels at corresponding locations in the downsampled first encoding prediction blocks and the downsampled second encoding prediction blocks; or a sum of squares of pixel differences of pixels at corresponding locations in the downsampled first encoding prediction blocks and the downsampled second encoding prediction blocks.

6. The method of claim 1, wherein the method further comprises rounding up or rounding down a prediction motion vector in the prediction motion vectors after determining the motion information.

7. The method of claim 1, wherein the method further comprises rounding up or rounding down a prediction motion vector in the prediction motion vectors corresponding to a second encoding prediction block in the second plurality of encoding prediction blocks.

8. An apparatus comprising:

a memory configured to store instructions; and one or more processors coupled to the memory and configured to execute the instructions to cause the apparatus to:

determine motion information of a to-be-encoded block, wherein the motion information comprises prediction motion vectors and prediction reference pictures, wherein the prediction motion vectors comprise a first base prediction motion vector and a second base prediction motion vector, and wherein the prediction reference pictures comprise a first prediction reference picture and a second prediction reference picture;

obtain a first plurality of encoding prediction blocks of the to-be-encoded block based on the prediction motion vectors;

obtain a second plurality of encoding prediction blocks of the to-be-encoded block, wherein the first plurality of encoding prediction blocks is in a one-to-one correspondence with the second plurality of encoding prediction blocks;

perform downsampling on the first plurality of encoding prediction blocks to obtain downsampled first encoding prediction blocks;

perform downsampling on the second plurality of encoding prediction blocks to obtain downsampled second encoding prediction blocks;

calculate a plurality of differences between the downsampled first encoding prediction blocks and the downsampled second encoding prediction blocks;

determine a minimum difference in the plurality of differences;

determine, a first target prediction motion vector based on the minimum difference;

derive a second target prediction motion vector based on the first target prediction motion vector;

obtain a first target encoding prediction block of the to-be-encoded block based on the first target prediction motion vector;

obtain a second target encoding prediction block of the to-be-encoded block based on the second target prediction motion vector; and encode, based on the first target encoding prediction block and the second target encoding prediction block, the to-be-encoded block into a bitstream.

9. The apparatus of claim 8, wherein the first target prediction motion vector is a forward target prediction motion vector and the second target prediction motion vector is a backward target prediction motion vector; or wherein the first target prediction motion vector is a backward target prediction motion vector and the second target prediction motion vector is a forward target prediction motion vector.

10. The apparatus of claim 8, wherein the one or more processors are further configured to execute the instructions to cause the apparatus to:

determine a first offset motion vector of the first target prediction motion vector based on the minimum difference; and determine the first target prediction motion vector based on the first offset motion vector and the first base prediction motion vector.

11. The apparatus of claim 10, wherein the one or more processors are further configured to execute the instructions to cause the apparatus to:

derive a second offset motion vector of the second target prediction motion vector based on the first offset motion vector; and determine the second target prediction motion vector based on the second offset motion vector and the second base prediction motion vector.

12. The apparatus of claim 8, wherein the differences between the downsampled first encoding prediction blocks and the downsampled second encoding prediction blocks comprise:

a sum of absolute values of pixel differences of pixels at corresponding locations in the downsampled first encoding prediction blocks and the downsampled second encoding prediction blocks; or a sum of squares of pixel differences of pixels at corresponding locations in the downsampled first encoding prediction blocks and the downsampled second encoding prediction blocks.

13. The apparatus of claim 8, wherein the one or more processors are further configured to execute the instructions to cause the apparatus to round up or round down a prediction motion vector in the prediction motion vectors.

14. The apparatus of claim 8, wherein the one or more processors are further configured to execute the instructions to cause the apparatus to round up or round down a prediction motion vector in the prediction motion vectors corresponding to a second encoding prediction block.

15. A non-transitory computer-readable medium configured to store computer instructions, that when executed by one or more processors of an apparatus, cause the apparatus to:
  determine motion information of a to-be-encoded block, wherein the motion information comprises prediction motion vectors and prediction reference pictures, wherein the prediction motion vectors comprise a first base prediction motion vector and a second base prediction motion vector, and wherein the prediction reference pictures comprise a first prediction reference picture and a second prediction reference picture;
  obtain a first plurality of encoding prediction blocks of the to-be-encoded block based on the prediction motion vectors;
  obtain a second plurality of encoding prediction blocks of the to-be-encoded block, wherein the first plurality of encoding prediction blocks is in a one-to-one correspondence with the second plurality of encoding prediction blocks;
  perform downsampling on the first plurality of encoding prediction blocks to obtain downsampled first encoding prediction blocks;
  perform downsampling on the second plurality of encoding prediction blocks to obtain downsampled second encoding prediction blocks;
  calculate a plurality of differences between the downsampled first encoding prediction blocks and the downsampled second encoding prediction blocks;
  determine a minimum difference in the plurality of differences;
  determine, a first target prediction motion vector based on the minimum difference;
  derive a second target prediction motion vector based on the first target prediction motion vector;
  obtain a first target encoding prediction block of the to-be-encoded block based on the first target prediction motion vector;
  obtain a second target encoding prediction block of the to-be-encoded block based on the second target prediction motion vector; and
  encode, based on the first target encoding prediction block and the second target encoding prediction block, the to-be-encoded block into the a bitstream.

16. The non-transitory computer-readable medium of claim 15, wherein the first target prediction motion vector is a forward target prediction motion vector and the second target prediction motion vector is a backward target prediction motion vector; or wherein the first target prediction motion vector is a backward target prediction motion vector and the second target prediction motion vector is a forward target prediction motion vector.

17. The non-transitory computer-readable medium of claim 15, wherein the computer instructions, when executed by the one or more processors of the apparatus, further cause the apparatus to:
  determine a first offset motion vector of the first target prediction motion vector based on the minimum difference; and
  determine the first target prediction motion vector based on the first offset motion vector and the first base prediction motion vector.

18. The non-transitory computer-readable medium of claim 17, wherein the computer instructions, when executed by the one or more processors of the apparatus, further cause the apparatus to:
  derive a second offset motion vector of the second target prediction motion vector based on the first offset motion vector; and
  determine the second target prediction motion vector based on the second offset motion vector and the second base prediction motion vector.

19. The non-transitory computer-readable medium of claim 15, wherein the differences between the downsampled first encoding prediction blocks and the downsampled second encoding prediction blocks comprise:
  a sum of absolute values of pixel differences of pixels at corresponding locations in the downsampled first encoding prediction blocks and the downsampled second encoding prediction blocks; or
  a sum of squares of pixel differences of pixels at corresponding locations in the downsampled first encoding prediction blocks and the downsampled second encoding prediction blocks.

20. The non-transitory computer-readable medium of claim 15, wherein the computer instructions, when executed by the one or more processors of the apparatus, further cause the apparatus to round up or round down a prediction motion vector in the prediction motion vectors after determining the motion information.

* * * * *